US012103000B2

(12) United States Patent
En-Yu Hui et al.

(10) Patent No.: US 12,103,000 B2
(45) Date of Patent: Oct. 1, 2024

(54) MICROFLUIDIC PHASE-CHANGE MEMBRANE MICROVALVES

(71) Applicant: THE REGENTS OF THE UNIVERSITY OF CALIFORNIA, Oakland, CA (US)

(72) Inventors: Elliot En-Yu Hui, Irvine, CA (US); Hinesh Vipul Patel, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 73 days.

(21) Appl. No.: 17/995,842

(22) PCT Filed: Apr. 9, 2021

(86) PCT No.: PCT/US2021/026698
§ 371 (c)(1),
(2) Date: Oct. 7, 2022

(87) PCT Pub. No.: WO2021/207686
PCT Pub. Date: Oct. 14, 2021

(65) Prior Publication Data
US 2023/0149923 A1 May 18, 2023

Related U.S. Application Data

(60) Provisional application No. 63/008,220, filed on Apr. 10, 2020.

(51) Int. Cl.
*B01L 3/00* (2006.01)

(52) U.S. Cl.
CPC ..... *B01L 3/502715* (2013.01); *B01L 3/50273* (2013.01); *B01L 3/502738* (2013.01);
(Continued)

(58) Field of Classification Search
CPC ........... B01L 3/502715; B01L 3/50273; B01L 3/502738; B01L 2200/0689;
(Continued)

(56) References Cited

U.S. PATENT DOCUMENTS 6,679,279 B1 * 1/2004 Liu .................. B01L 3/502738 137/806
7,195,036 B2 * 3/2007 Burns ................ F16K 99/0017 137/251.1
(Continued)

*Primary Examiner* — John Bastianelli
(74) *Attorney, Agent, or Firm* — NGUYEN TARBET IP LAW

(57) ABSTRACT

The present invention is directed to the fabrication and use of phase-change material (PCM) membranes in microvalves for microfluidic systems. The microvalve may be fabricated by using a tissue-sectioning instrument to slice a thin membrane of PCM off of a block of PCM. The membrane may then be sandwiched between a plurality of microfluidic flow sections to act as a microvalve. At room temperature, the membrane may exist in a solid state to act as a zero-leakage seal and microvalve. Applying heat to the membrane may bring the membrane to a melting point, causing it to reach a liquid state. The microvalve in the liquid state may experience a surface tension effect by a material of the microfluidic flow sections, causing it to displace from a flow path and allow a fluid to pass from one microfluidic flow section to another.

19 Claims, 22 Drawing Sheets

(52) U.S. Cl.
CPC .................. *B01L 2200/0689* (2013.01); *B01L 2300/0861* (2013.01); *B01L 2400/0677* (2013.01)

(58) Field of Classification Search
CPC ..... B01L 2300/0861; B01L 2400/0677; B01L 2200/12; B01L 2400/0683; B01L 3/502707; F16K 99/0036
USPC .......................................................... 137/828
See application file for complete search history.

(56) References Cited

U.S. PATENT DOCUMENTS

| | | | | |
|---|---|---|---|---|
| 7,926,514 | B2 * | 4/2011 | Park | F16K 99/0019 137/828 |
| 7,980,272 | B2 * | 7/2011 | Park | F16K 99/004 137/828 |
| 8,281,815 | B2 * | 10/2012 | Park | F16K 99/004 137/828 |
| 2002/0096222 | A1 * | 7/2002 | Ueno | F15C 5/00 137/828 |
| 2005/0284526 | A1 * | 12/2005 | Welle | F16K 99/0032 137/828 |
| 2006/0180223 | A1 * | 8/2006 | Broyer | F15C 5/00 137/828 |
| 2006/0219308 | A1 * | 10/2006 | Oh | F16K 99/0046 137/827 |
| 2008/0058192 | A1 * | 3/2008 | Cho | B01L 3/502738 494/13 |
| 2010/0101660 | A1 * | 4/2010 | Kitamura | F16K 99/0061 137/833 |
| 2010/0186839 | A1 * | 7/2010 | Namkoong | F16K 99/004 137/825 |
| 2017/0059843 | A1 * | 3/2017 | Mangham | B01L 3/508 |
| 2018/0093270 | A1 * | 4/2018 | Ladtkow | B01L 3/502738 |

* cited by examiner

| Product | Reaction Volume | Consumable Cost | Throughput (dp = datapoints) | Capital Investment | Price per data point | Critical Flaws |
|---|---|---|---|---|---|---|
| Standard KASP | 3 µL | $10/plate | 1536 dp/plate | Std. equip. | 10-20¢ | Price and Throughput |
| Douglas Sci. IntelliQube | 1.6 µL | N/A | 38,400 dp/roll | New platform | 10¢? | Flexibility & Price |
| Fluidigm Juno | 10 nL | $400/chip | 9216 dp/chip | New platform | 4¢ | Flexibility & Price |
| Takara SmartChip | 100 nL | $300/chip | 4608 dp/chip | New platform | 7¢ | Price |
| Genotyping by Sequencing | N/A | N/A | Up to 100,000s dp/reaction | New platform | 12¢ at high sample vol. | High Error Rate |
| **Proposed Device** | **100 nL** | **$40/chip** | **5520 dp/plate** | **Std. equip. + plate reader** | **1¢** | **None** |

FIG. 11

MICROFLUIDIC PHASE-CHANGE MEMBRANE MICROVALVES

CROSS-REFERENCES TO RELATED APPLICATIONS

This application claims benefit of U.S. Provisional Application No. 63/008,220 filed Apr. 10, 2020, the specification of which is incorporated herein in its entirety by reference.

STATEMENT REGARDING FEDERALLY SPONSORED RESEARCH OR DEVELOPMENT

This invention was made with government support under Grant No. IIP-1362165, awarded by the National Science Foundation. The government has certain rights in the invention.

FIELD OF THE INVENTION

The present invention is directed to the fabrication and application of microvalves for the fluidic control and handling of two or more independent fluid contents, and their mixing at the micro-scale in a lab-on-a-chip device. The present invention is additionally directed to the use of such systems in screening pairwise combinatorial chemistries between a first and a second set of liquids, or the various biological, chemical, or diagnostic assays derived thereof.

BACKGROUND OF THE INVENTION

Lab-on-a-chip (LOC) technologies provide an opportunity to consolidate various laboratory functions into integrated microfluidic circuits. These functions include metering and mixing reagents, running biochemical assays, sensing analytes, and analyzing results. The advantage of microfluidics is the manipulation of small fluid volumes at the micro-scale which enables automation, higher throughput, significant cost-reduction, massive parallelization, and faster analyses in a compact chip format. As a result, they reduce the need for bulky laboratory equipment, large quantities of expensive reagents, and overall time and labor previously required to perform these different laboratory processes. Although significant research efforts have focused on realizing this potential, barriers to successful commercialization of LOC devices still remain. A primary barrier is integration of fluid handling elements such as micropumps and microvalves critical to device operation. Therefore, over recent years significant attention and progress have been made towards the development of suitable microvalves.

Despite this focus, many of these valves require expensive and bulky off-chip components or complex cleanroom fabrication processes in order to operate. These inherent limitations preclude them from being low-cost disposable solutions. Historically, in addition to cleanroom fabrication processes, the use of microvalves has required multi-layer assembly to integrate them into LOC devices. This becomes an increasingly non-trivial task as the capabilities, size, and density of the devices scale. Flexible membranes are central to this assembly process and the working mechanism of many current microvalve technologies. Materials often used for flexible membranes exhibit poor thermal conductivity and non-negligible liquid biomolecule absorption. When performing biochemical assays in small fluid volumes at the micro-scale, minor fluctuations in non-specific biomolecule absorption can be detrimental to the reliability and reproducibility of results.

Microvalves can be broadly categorized into either active or passive valves. As mentioned, many conventional active microvalves use a flexible membrane coupled to an electromechanical or pneumatic actuator. As a result of this coupling, they require additional costly equipment to operate. One attractive non-mechanical active valve operates through the use of smart materials such as phase-change materials (PCMs). These materials are cheap and disposable making them well suited for LOC applications. They operate by thermal actuation where a simple heat source induces a solid-to-liquid phase transition. Phase-change material such as paraffin wax have been used as microvalves by either acting to displace elastomeric membranes or as plugs within microchannels that are displaced by capillary forces or pressure differentials once melted. One benefit of phase change materials is low energy consumption as they inherently persist in latched open or closed states. Plug-type actuation valves have typically been single-use and require lengthy fabrication in order to appropriately incorporate paraffin at specific locations within a microfluidic channel network. While researchers have also demonstrated multiple actuation cycles of paraffin wax microvalves in microfluidic devices, there still remain a number of limitations reducing its tractability as a commercial success.

Previously demonstrated wax microvalve technologies in microfluidics exhibit a few key limitations that pose a significant barrier to commercial success. These disadvantages deal primarily with the requirements for fabrication and basic operation of these devices. Firstly, fabrication either requires cleanroom based micro-fabrication techniques, labor-intensive manual application and sealing of wax within microchannels, or a combination of both. The devices then require a pressure differential during operation to displace liquid paraffin from the microchannel to open the valve and allow for subsequent fluid flow. While useful for research purposes, many previously published techniques to address some of the inherent limitations of current wax microvalves do not easily scale with current industrial manufacturing processes. For example, Oh, Kwang-wook; "Microvalve having magnetic wax plug and flux control method using magnetic wax;" U.S. Pat. No. 7,478,792 B2; January, 2009, requires, for each individual microvalve, a moving magnet mechanism, a selective heating mechanism, and a plurality of channels for holding these components and allowing movement of the wax. In another example, Burns, Mark; "Thermal micro-valves for micro-integrated devices;" U.S. Pat. No. 7,195,036 B2; March, 2007, requires the milling of a plurality of channels to allow melted wax to move in and out of a channel blocking area, and a plurality of channels that allow air pressure to move said melted wax. As a result, it currently prohibits achieving higher densities of microvalves, and therefore chip capabilities, without concurrently increasing the complexity of operation. One approach is to use local electrical heating elements paired with a microvalve as a means of individually addressing microvalves and interfacing with electrical connections. In most cases, the number of independent heating elements needed to address each microvalve individually, grows linearly with valve densities. Designing such a chip capable of 1536 independent reactions at densities that compare to operations in microtiter plates, would require a non-trivial number of heating elements and electrical connections, thereby increasing chip complexity and cost. While published demonstrations highlight the robustness of paraffin microvalves, specific approaches to-date would require significant channel complexity, time-consuming fabrication, and unrealistic number of pressure or heat inputs in order to operate as true LOC technologies.

BRIEF SUMMARY OF THE INVENTION

It is an objective of the present invention to provide devices and fabrication methods that allow for compact and energy efficient microvalves for use in lab-on-a-chip microfluidic devices, as specified in the independent claims. Additionally, it is an objective of the present invention to provide a method of efficiently producing all pairwise combinations of a first set of liquids and a second set of liquids. Embodiments of the invention are given in the dependent claims. Embodiments of the present invention can be freely combined with each other if they are not mutually exclusive.

The present invention features a system for controlling a flow path of a fluid at the micro-scale through the use of phase-change microvalves. The system may comprise a first and a second microfluidic flow section as components of a microfluidic system. A membrane comprising a phase-change material may be sandwiched between the first and the second microfluidic flow sections to act as a microvalve. The phase-change material may be solid at room-temperature, but become a liquid with the application of heat. The system may further comprise a heating element capable of raising the temperature of the membrane to a melting point. As non-limiting examples, the heating element may be an external heat source applied by a user or a thermocycler that contains the system as a whole. When the membrane is solid, it may block the fluid from traveling from the first microfluidic flow section to the second. As the membrane enters the liquid state, the fluid may apply a buoyancy differential to the microvalve and a material of the microfluidic system may apply a surface tension effect to the material of the microvalve, causing it to displace from a path of the flow section and allow the fluid to pass through.

The present invention features a method to fabricate and operate novel paraffin thermal microvalves. These valves consist of a thin paraffin membrane which serves to provide a zero-leakage valve between two or more fluid compartments in a microfluidic device. Upon heating and actuation of the valves, which do not require pressure differentials to open, fluids are driven to mix without leakage. Such unique valves can be used in a variety of devices. One example is to generate and manipulate microfluidic droplets within a layered device. Droplets generated on different layers are organized into different sample-reagent pairs but do not interact. When a single heat source is applied, the valves are simultaneously actuated, and the different sample-reagent paired droplets simultaneously merge across layers while maintaining their initial organization between other paired droplets. This greatly simplifies the task of arraying large numbers of droplets into groups in a specific manner and then mixing the contents of each group together. This allows, for example, an array of genotyping reactions to be prepared in which all binary combinations of M samples and N allele detection reagents are generated to create M×N reactions.

One of the unique and inventive technical features of the present invention is the use of tissue sectioning instruments and methods for the fabrication of PCM microvalves. Without wishing to limit the invention to any theory or mechanism, it is believed that the technical feature of the present invention advantageously provides for time-efficient, material-efficient, and cost-efficient fabrication of microvalves for microfluidic systems. None of the presently known prior references or work has the unique inventive technical feature of the present invention. Surprisingly, the fabrication method of the present invention provides for quicker and less-expensive fabrication of microvalves that at least match the quality of microvalves fabricated through the use of specialized cleanroom microfabrication tools.

Another one of the unique and inventive technical features of the present invention is the use of a PCM membrane as a microvalve in a microfluidic system that is thin relative to the dimensions of the microfluidic system. Without wishing to limit the invention to any theory or mechanism, it is believed that the technical feature of the present invention advantageously provides for cost-efficient and effective microvalves for microfluidic systems. None of the presently known prior references or work has the unique inventive technical feature of the present invention. Furthermore, the feature of the present invention led to a surprising result. For example, in microfluidic systems where a single PCM sheet is sandwiched between multiple microfluidic flow sections, the entirety of the membrane is melted and brought to a liquid state with the application of heat from a heating element. In other words, the microvalve comprises sections within the microfluidic system and sections outside of the microfluidic system. One skilled in the art would expect the sections outside of the microfluidic system to create leakage paths. Thus, the feature of the present invention is counterintuitive. Surprisingly, in the liquid state, the microvalve sections within the microfluidic system move to displace from a flow path, while the microvalve sections outside of the microfluidic system cling to an outer surface of the microfluidic system, preventing leakage and moving the microvalve into an "opened" state through heat alone.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

FIG. 11 shows a table of the cost and effectiveness of prior microvalve systems.

DETAILED DESCRIPTION OF THE INVENTION

Figure 1B:
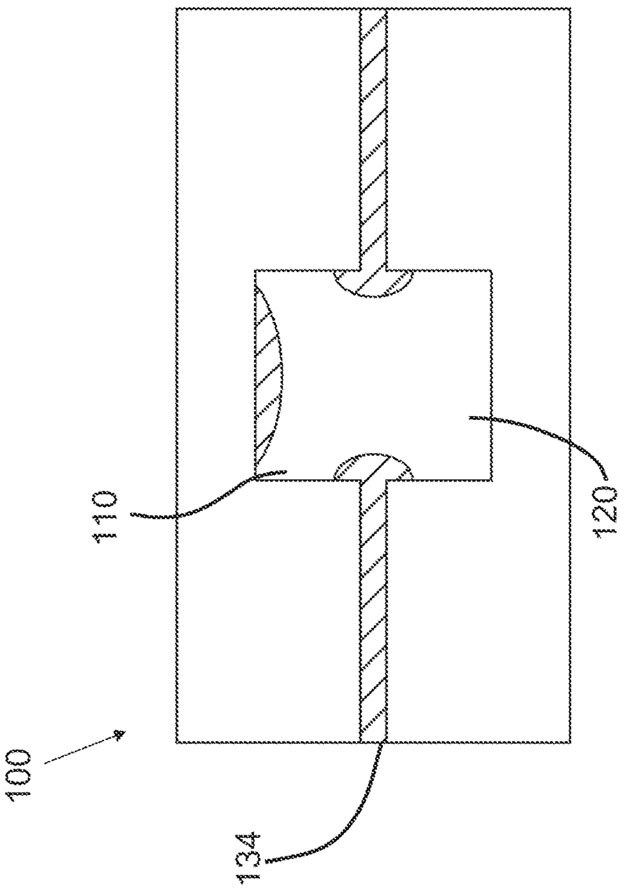
FIG. 1B shows a diagram of a PCM microvalve in a liquid state applied to a microfluidic system.

Following is a list of elements corresponding to a particular element referred to herein:

100 microfluidic system
110 first microfluidic flow section
120 second microfluidic flow section
130 membrane
132 solid state of PCM
134 liquid state of PCM
140 heating element
200 microfluidic system
500 block of PCM
510 tissue sectioning instrument As used herein, the phrase "thin relative to" refers to a membrane with a width of at most ⅕ of any combination of a width, a length, and a height of the chamber.

As used herein, the term "room temperature" refers to a temperature of about 20 to 25° C. (68-77° F.; 293-298 K; 528-537° R).

As used herein, the term "blocked" refers to a configuration of a valve that prevents passage of a liquid from a first location to a second location through the valve.

As used herein, the term "melting point" refers to a temperature that causes a respective material to change from a solid state to a liquid state. For example, a melting point of paraffin wax is about 50 to 57° C.

As used herein, the term "liquid state" refers to a state of a material where it may be capable of being displaced and may conform to the shape of its container but retains a (nearly) constant volume independent of pressure.

As used herein, the term "sufficient degree of displacement" refers to a configuration of a valve that allows passage of a liquid from a first location to a second location through the valve.

Figure 1A:
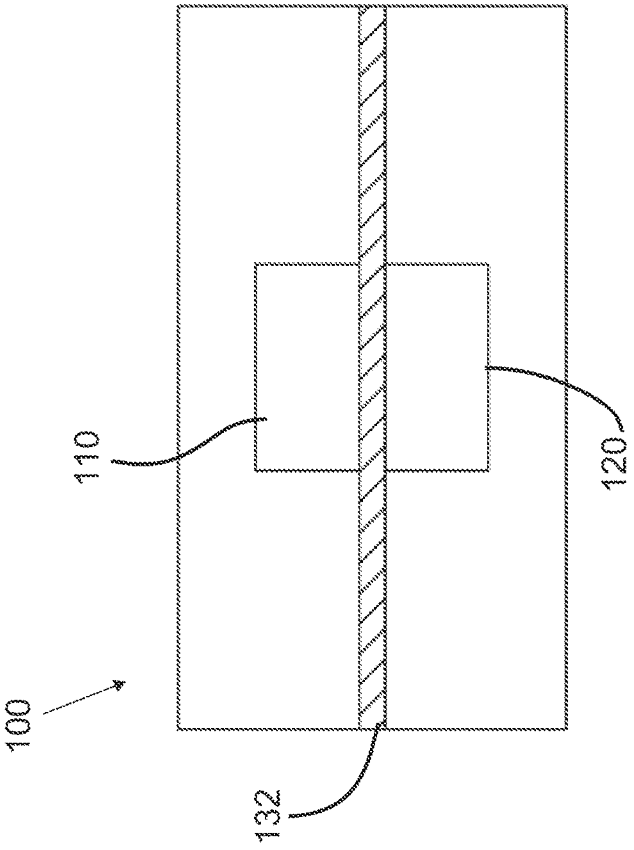
FIG. 1A shows a diagram of a PCM microvalve in a solid state applied to a microfluidic system.
Figure 1C:
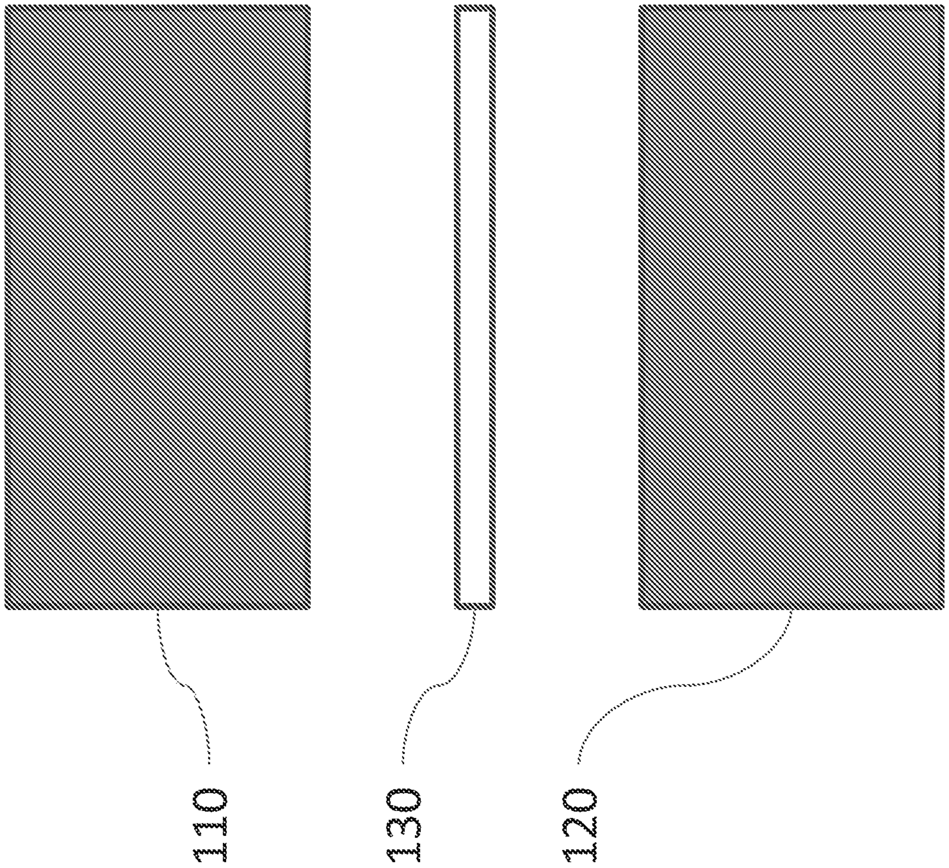
FIG. 1C shows a blowout diagram of a PCM microvalve in a solid state simultaneously serving as the sealed floor of the first microfluidic flow section and the sealed ceiling of the second microfluidic flow section.

Referring to FIG. 1, the present invention features a system for controlling a flow path of a fluid at the microscale through the use of phase-change microvalves. In some embodiments, the system may comprise a microfluidic system (100) having a first microfluidic flow section (110), and a second microfluidic flow section (120). The system may further comprise a membrane (130) comprising a phase-change material (PCM) acting as a microvalve. The phase-change material may have a solid form at room temperature but may enter a liquid form by applying heat to the material. In some embodiments, the phase-change material is paraffin wax and may have a thickness of 1 μm to 500 μm. In some embodiments, the phase-change material may be selected from a group comprising paraffin wax, hydrated salt, non-paraffin organics, metallics, and a combination thereof. In other embodiments, the membrane (130) may have a thickness of 10 nm to 1 cm. In some embodiments, the membrane (130) may have a thickness of 10 nm to 1 μm. In other embodiments, the membrane (130) may have a thickness of 1 μm to 500 μm. In other embodiments, the membrane (130) may have a thickness of 500 μm to 1 cm. Larger or smaller thicknesses may be used as usable thicknesses depend on microfluidic flow sections designs. Thicknesses of the membrane (130) should likely be chosen such that the total volume of the membrane presiding between two microfluidic flow sections should not exceed the volume determined by the combined dimensions of the of the open channels within the microfluidic flow sections that the membrane resides between. Membranes of less dense material than aqueous solutions, such as paraffin, will float atop the aqueous solutions and solidify once the device cools down. Membranes of more dense material than aqueous solutions, such as metallics, may sink to the bottom of aqueous solutions and solidify one the device cools down. The material may have the added benefit of acting as an insulator or barrier to vapor, absorption, etc. The membrane (130) may be sandwiched between the first microfluidic flow section (110) and the second microfluidic flow section (120) to act as a microvalve. The system may further comprise a heating element (140) capable of applying heat to the membrane (130). The fluid directed through the first microfluidic flow section (110) may be blocked from reaching the second microfluidic flow section (120) by the microvalve when the membrane is in a solid state (132). Actuating the heating element (140) may cause the membrane (130) to reach a liquid state (134). As the membrane (130) reaches the liquid state (134), the microvalve may displace from a flow path of the microfluidic system (100) by a surface tension effect, allowing the fluid to travel from the first microfluidic flow section to the second microfluidic flow section. In some embodiments, the surface tension effect is applied by a material of the microfluidic system (100) interacting with the PCM of the membrane (130). Additionally, a buoyancy differential may be applied to the microvalve in the liquid state (134) by the fluid. The membrane may be thin relative to the dimensions of the chamber. The membrane may be thin relative to any combination of a width, a length, and a height of the chamber. If two microscale liquid chambers are separated by a relatively thick piece of wax, it will remain in place even when the wax melts, blocking the liquids from mixing. More than one membrane may be sandwiched between the first microfluidic flow section (110) and the second microfluidic flow section (120) acting as the microvalve. The components of the system may be repeated to create a more complex microfluidic system. In such embodiments, the heating element (140) may be capable of heating a plurality of membranes from the solid state (132) to the liquid state (134). In some embodiments, a plurality of PCMs may be used to fabricate a plurality of membranes between the first microfluidic flow section (110) and the second microfluidic flow section (120). A first PCM of the plurality of PCMs may have a melting point different from a melting point of a second PCM of the plurality of PCMs. This may provide multiple temperature trigger points for actuation of different valves in the same complex system. In some embodiments, the first microfluidic flow section (110) may be a microchamber or microchannel and the second microfluidic flow section (120) may be a microchamber or microchannel. In some embodiments, the membrane (130) may act as a boundary layer for fluid flow within the microfluidic system (100) and may not act as a valve at all. The boundary layer of PCM may render the device reusable.

Figure 2:
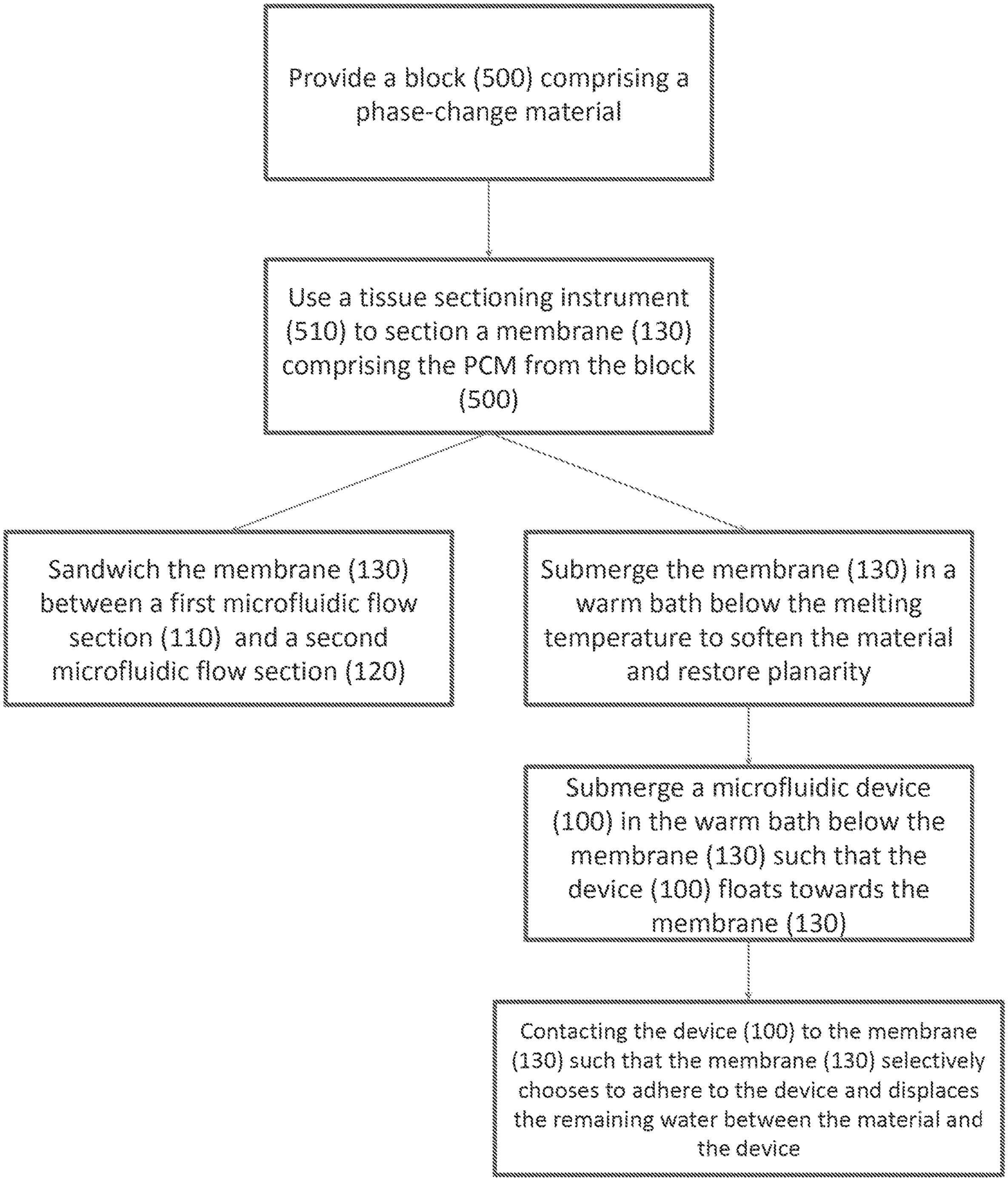
FIG. 2 shows a flow chart of a method of fabricating membrane microvalves out of a PCM block.

Referring to FIG. 2, the present invention features a method of fabricating a microvalve comprising a PCM for microfluidic systems. In some embodiments, the method may comprise providing a block (500) of the PCM. The PCM may comprise paraffin wax. In some embodiments, the phase-change material may be selected from a group comprising paraffin wax, hydrated salt, non-paraffin organics, metallics, and a combination thereof. Membranes of less dense material than aqueous solutions, such as paraffin, will float atop the aqueous solutions and solidify once the device cools down. Membranes of more dense material than aqueous solutions may sink in the aqueous solutions and solidify once the device cools down. The material may have the added benefit of acting as an insulator or barrier to vapor, absorption, etc. The PCM may be in a solid state at room temperature but may reach a liquid state by applying heat. The method may further comprise sectioning a membrane (130) of the PCM from the block (500) through the use of a tissue sectioning instrument (510). The tissue sectioning instrument (510) may be a microtome and the membrane (130) cut from the block (500) may have a thickness of 10 nm to 1 cm. In some embodiments, the membrane (130) may have a thickness of 10 nm to 1 μm. In other embodiments, the membrane (130) may have a thickness of 1 μm to 500 μm. In other embodiments, the membrane (130) may have a thickness of 500 μm to 1 cm. Other methods of sectioning or rolling phase change materials into membranes may be used. Larger or smaller thicknesses may be used as usable thicknesses depend on microfluidic flow sections designs. Thicknesses of the membrane should likely be chosen such that the total volume of the membrane presiding between two microfluidic flow sections should not exceed the volume determined by the combined dimensions of the of the open channels within the microfluidic flow sections that the membrane resides between. In some embodiments, the method may further comprise sandwiching the membrane (130) between a first microfluidic flow section (110) and a second microfluidic flow section (120), wherein the membrane (130) in a solid state (132) acts as a zero-leakage microvalve between the first microfluidic flow section (110) and the second microfluidic flow section (120). In other embodiments, after sectioning the material, the fabrication method may further comprise placing the material in a warm water bath below the melting temperature to soften the material and restore planarity which may have been lost during the sectioning process. A microfluidic flow section may then be submerged in the water and approach the underside of the floating material from below. Once contact is made, the material may selectively choose to adhere to the device and in the process displace the remaining water between the material and the device. In some embodiments, more than one membrane is sectioned from the block (500) to be sandwiched between the first microfluidic flow section (110) and the second microfluidic flow section (120) to act as the microvalve. Additional synthetic membranes can be incorporated by coating the entirety of the membrane in the phase change material in liquid form and allowing it to cool and set. Synthetic membranes such as, but not limited to, nitrocellulose can be purposefully loaded with biomolecules of interest at locations of interest that correspond to microvalve or other regions in the microfluidic flow sections. The membrane can then be coated in entirety with the phase change material. This can be used as a secondary form for detection and analysis of biomolecules of interest such as proteins, nucleic acids, or other small molecules, chemicals, or biological agents. It is difficult to fabricate a thin membrane suspended inside of a microscale chamber. However, the method of the present invention makes it possible to sandwich a continuous sheet of wax between two layers containing patterned microfluidic channels and chambers. Due to the unique fabrication of these thin membranes including the hydrophobic nature of paraffin, membranes can be sealed against exposed microfluidic flow sections to thereby act as the ceiling or floor of that microfluidic flow section independently of operating as a valve as well as in conjunction with and prior to operating as a valve.

Figure 3:
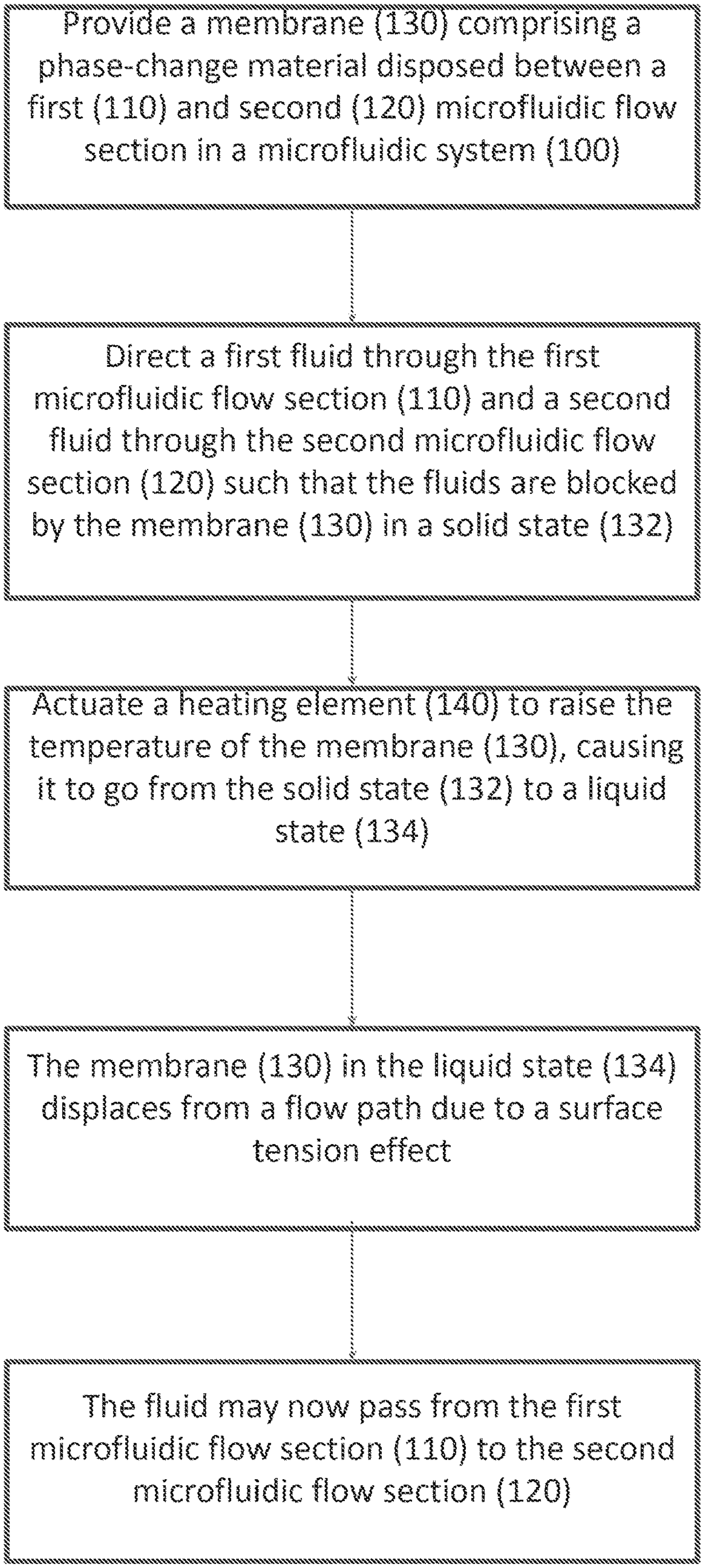
FIG. 3 shows a flow chart of a method of actuating a PCM microvalve in a microfluidic system.

Referring now to FIG. 3, the present invention features a method of actuating a microvalve in a microfluidic system (100). In some embodiments, the method may comprise providing a membrane (130) comprising a PCM to act as the microvalve. The PCM may be paraffin wax. Membranes of less dense material than aqueous solutions, such as paraffin, will float atop the aqueous solutions and solidify once the device cools down. Membranes of more dense material than aqueous solutions may sink in the aqueous solutions and solidify once the device cools down. The material may have the added benefit of acting as an insulator or barrier to vapor, absorption, etc. The membrane (130) may have a solid state (132) at room temperature but may reach a liquid state (134) by applying heat to the membrane (130). Said membrane (130) may be sandwiched between a first microfluidic flow section (110) and a second microfluidic flow section (120) in the microfluidic system (100) to act as a microvalve. The method may further comprise directing a fluid through the first microfluidic flow section (110) such that it is blocked from entering the second microfluidic flow section (120) by the microvalve in a solid state (132). The method may further comprise actuating a heating element (140) to raise the temperature of the membrane (130), such that the membrane (130) goes from a solid state (132) to a liquid state (134). As the membrane (130) reaches the liquid state (134), the microvalve may displace from a flow path of the microfluidic system (100) to allow passage from the first microfluidic flow section (110) to the second microfluidic flow section (120). Other methods to dissolve the membrane, such as a change in the pH, ion concentration, light, or chemical composition of the liquid in contact with the membrane may be used. In some embodiments, the microvalve in the liquid state (134) may move as a result of a surface tension effect applied by a material of the microfluidic system (100) interacting with the PCM of the membrane (130). Additionally, the membrane (130) in the liquid state (134) may move as a result of a buoyancy differential applied by the fluid. The fluid may then flow from the first microfluidic flow section (110) to the second microfluidic flow section (120). In some embodiments, more than one membrane is sandwiched between the first microfluidic flow section (110) and the second microfluidic flow section (120) to act as the microvalve.

Figure 4B:
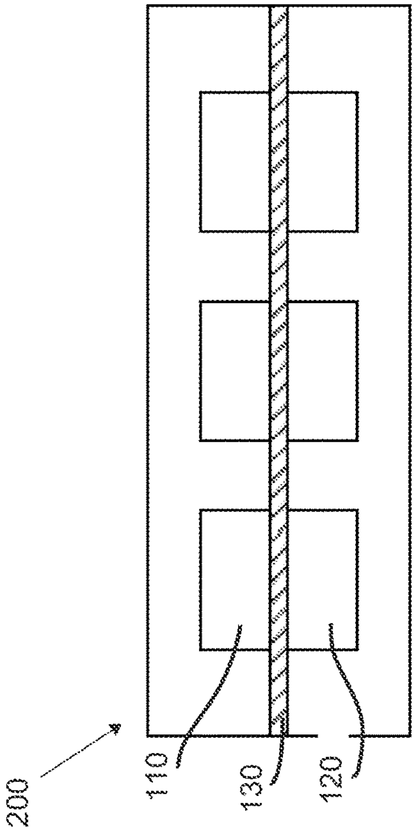
FIG. 4B shows a diagram of a microfluidic system utilizing a single membrane to act as a plurality of microvalves.
Figure 4A:
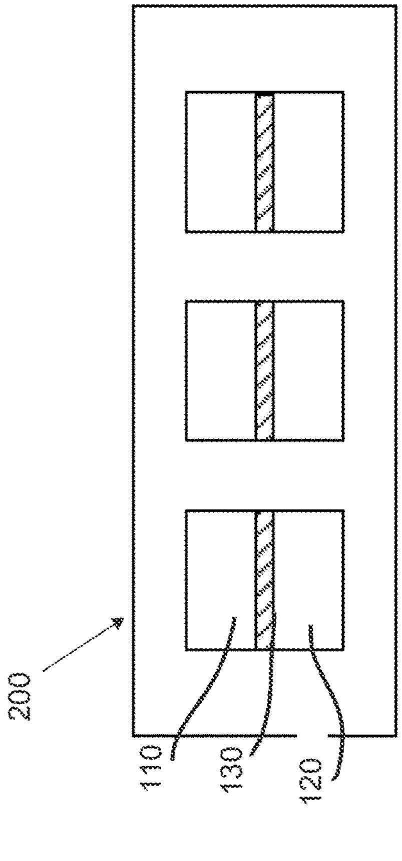
FIG. 4A shows a diagram of a microfluidic system utilizing a plurality of membrane microvalves.

Referring now to FIGS. 4A-4B, the present invention features a microfluidic system (200) for controlling a path of a fluid using a phase-change microvalve. In some embodiments, the system may comprise a plurality of flow sections and a plurality of phase-change microvalves, each microvalve (130) comprising at least one phase-change material (PCM) membrane. The PCM may comprise paraffin wax and may have a thickness of 10 nm to 1 cm. In some embodiments, the membrane (130) may have a thickness of 10 nm to 1 μm. In other embodiments, the membrane (130) may have a thickness of 1 μm to 500 μm. In other embodiments, the membrane (130) may have a thickness of 500 μm to 1 cm. In some embodiments, the phase-change material may be selected from a group comprising paraffin wax, hydrated salt, non-paraffin organics, metallics, and a combination thereof. Larger or smaller thicknesses may be used as usable thicknesses depend on microfluidic flow sections designs. Thicknesses of the membrane should likely be chosen such that the total volume of the membrane presiding between two microfluidic flow sections should not exceed the volume determined by the combined dimensions of the of the open channels within the microfluidic flow sections that the membrane resides between. The membrane may be thin relative to dimensions of the microfluidic system (200). The membrane (130) may be thin relative to any combination of a width, a length, and a height of the chamber. Membranes of less dense material than aqueous solutions, such as paraffin, will float atop the aqueous solutions and solidify once the device cools down. Membranes of more dense material than aqueous solutions may sink to the bottom of aqueous solutions and solidify one the device cools down. The material may have the added benefit of acting as an insulator or barrier to vapor, absorption, etc. Each microvalve (130) of the plurality of microvalves may be sandwiched between a first microfluidic flow section (110) of the plurality of microfluidic flow sections and a second microfluidic flow section (120) of the plurality of microfluidic flow sections. In some embodiments, more than one microvalve (130) is disposed between the first microfluidic flow section (110) and the second microfluidic flow section (120). In other embodiments, a single microvalve (130) is sandwiched between a plurality of first microfluidic flow sections and a plurality of second microfluidic flow sections, as seen in FIG. 4B. The PCM membrane may be in a solid state (132) at room temperature and may be capable of reaching a liquid state (134) by applying heat to the membrane (130). As seen in FIG. 4B, since there is a single continuous wax sheet, it would be intuitive to expect that when the wax is melted, it will run everywhere, creating many leakage paths in the microfluidic network. Instead, only the parts of the membrane that act as microvalves are able to move when melted. The remainder of the molten wax is pinned in place. The fluid directed through the first microfluidic flow section (110) may be blocked from reaching the second microfluidic flow section (120) by the microvalve (130) when the membrane is in the solid state (132). Heating the PCM membrane to its melting point may cause the microvalve to enter a liquid state (134), causing it to displace from a flow path of the microfluidic system (200) by a surface tension effect, allowing the fluid to travel from the first microfluidic flow section (110) to the second microfluidic flow section (120). Each microfluidic flow section of the plurality of microfluidic flow sections may comprise a microchannel or a microchamber. Additionally, the fluid may apply a buoyancy differential to the microvalve in the liquid state (134), causing the microvalve in the liquid state (134) to move upward.

Figure 5:
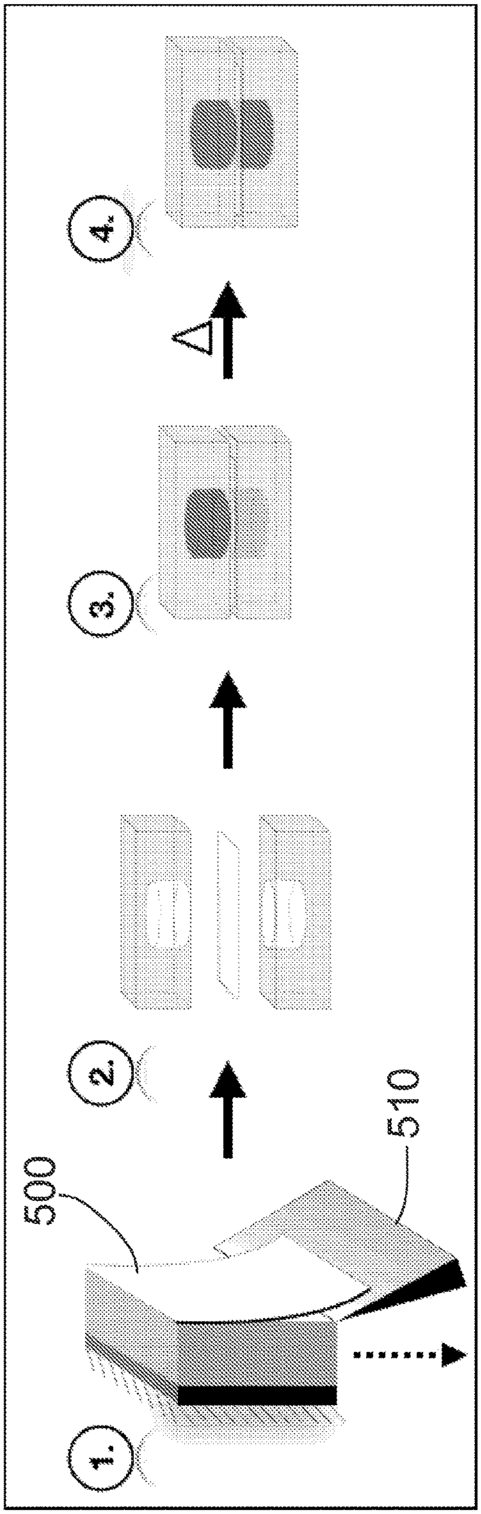
FIG. 5 shows a diagram of a method of fabricating, applying, and actuating a single PCM microvalve.
Figure 6:
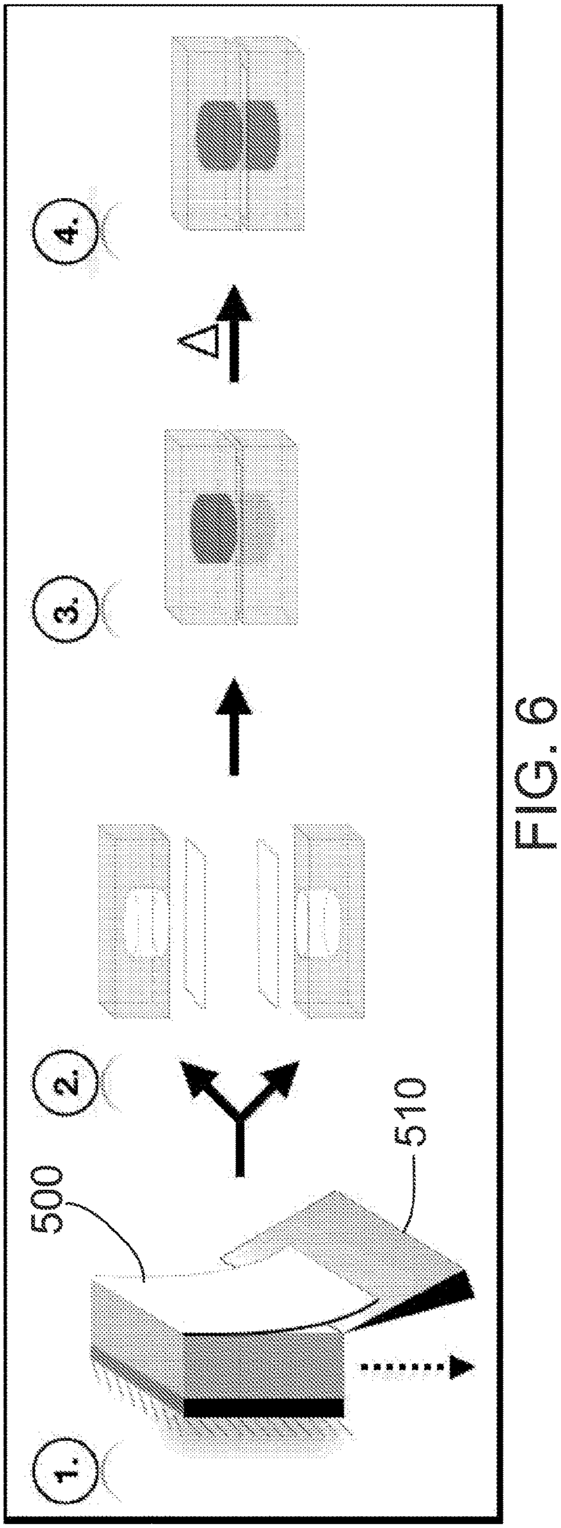
FIG. 6 shows a diagram of a method of fabricating, applying, and actuating two PCM membranes to act as a single PCM microvalve.

The present invention describes new microvalve technology that uses phase-change materials (PCM) and is compatible within microfluidic systems. Inherent to the invention are a number of key and novel features including its actuation, fabrication and structure. Central to the present invention is the use of a thin paraffin membrane that serves as a thermally actuated microfluidic valve. The membrane is sectioned from a block of pure paraffin wax using a microtome and standard tissue sectioning methods used for histology in pathology labs as shown in FIG. 5 and FIG. 6. In addition, the melting point of paraffins is dictated by the length of the hydrocarbon chain. Use of paraffins with different melting points can enable two or more stages of actuation within a single device, or variations of devices depending on operational temperature requirements. This illustrates the flexibility of the invention. Moreover, although valving technology using paraffin wax has been tested, many other PCM's are usable for the same purpose.

These membranes are sandwiched between two microfluidic channel networks (MCN's) as shown in FIG. 5 such that either the floor or ceiling of the channels comprises a microvalve. Since paraffin is solid at room temperature, it provides a strong seal of the microfluidic channels. The paraffin also acts as a zero-leakage valve, meaning each MCN (top and bottom in the figure) can be operated individually and with a different composition of fluids without cross contamination. A second assembly scheme shown in FIG. 6 increases the robustness of the present invention, thereby allowing each MCN to be sealed, operated, stored, and handled independently of each other, prior to the time of operation and valve actuation. These two independent systems can be aligned and assembled for operation. This illustrates the modularity of the system enabled by the novel use of a thin membrane valve. This feature facilitates priming of independent sealed MCN's with biomolecules of interest for either immediate use, or storage and later use.

Another novel feature of the present invention is the method of actuation. Through leveraging properties of paraffin such as density and surface tension, heat alone is needed to actuate the microvalve. When heat is applied, the entire paraffin layer melts, and so the structure seems vulnerable to leaking. However, the dominance of surface tension forces at the microscale acts as an advantage. In regions where paraffin is in direct contact with the structural material above and below, the melted paraffin remains pinned in place by surface tension, and no leaking occurs. At the same time, in regions where paraffin is suspended between two channels or chambers, the thin paraffin membrane becomes unstable once it has melted. Controlling regions of channel or chamber overlap between the top and bottom microfluidic networks when designing these elements, inherently controls placement of valve locations. Valves exist in an initially "latched closed" position. Once heat is applied, in overlapping regions the buoyancy of melted paraffin compared to the aqueous solutions within the channels and the surface tension between melted paraffin and the channel walls serve to open the valve. During this process an instability in the melted paraffin results that drives the paraffin upwards to the ceiling of the top MCN layer. A connection is formed between the previously separated aqueous fluids resulting in a "latched open" valve configuration and mixing of the two fluids. Moreover, since the entire paraffin sheet melts upon heating, an array of paraffin microvalves can simultaneously be actuated in parallel by bulk heating. The latter is something not previously achievable. Alternatively, a subset of valves in a larger array can be independently addressed and actuated by local heating through embedded electrical resistive heating elements, focused lasers, or radiative heating from LEDs.

The choice of designs and materials for the MCN's is flexible and can be user defined. Paraffin microvalves can be employed to gate the merging of two chambers, or gate the connection of two channels, or gate the connection of a channel to a chamber. In addition, paraffin microvalves can gate the connection of three or more regions by chaining together a series of connections as shown in FIG. 7D. It has also been shown that in a two-phase system of aqueous droplets, droplets can be confined on either side of a paraffin microvalve. Droplets are impeded from passing through the microvalve at temperatures below the paraffin's melting point. In particular, two droplets can be isolated from one another on opposite sides of the microvalve. When desired, the microvalve can be actuated or permeabilized by applying heat and subsequently melting the paraffin. Specifically, it has been shown that if a heat is applied to a thin paraffin microvalve between two droplets that are directly opposite one another on either side of the microvalve, the paraffin will melt and due to a specific gravity <1, will float above both droplets, thereby allowing them to merge and allowing the droplet contents to mix. It may also be possible to merge droplets across a rigid microvalve with paraffin-filled pores separating droplets on either side, where each pore is acting as a thermally actuated paraffin valve.

Figure 7A:
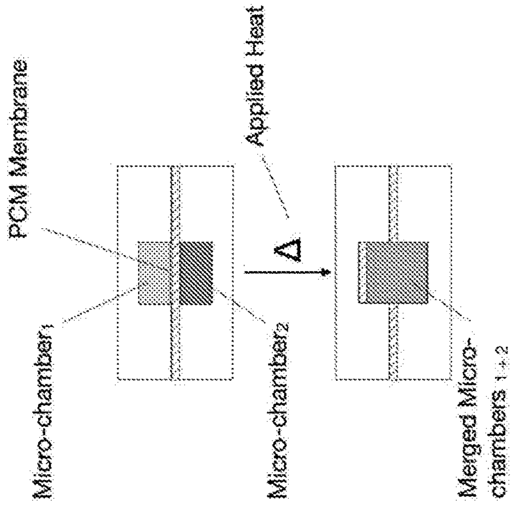
FIG. 7A shows a diagram of a first and second microchamber separated by a PCM microvalve.

Referring now to FIG. 7A, a first microfluidic flow section may comprise a first microchamber and a second microfluidic flow section may comprise a second microchamber. The microchambers may be separated by a solid PCM membrane. Heat greater than or equal to a melting temperature of the PCM membrane is applied. The liquid PCM may displace, removing a barrier between the two microchambers, creating an open valve and allowing fluid contents of each microchamber to merge.

Figure 7B:
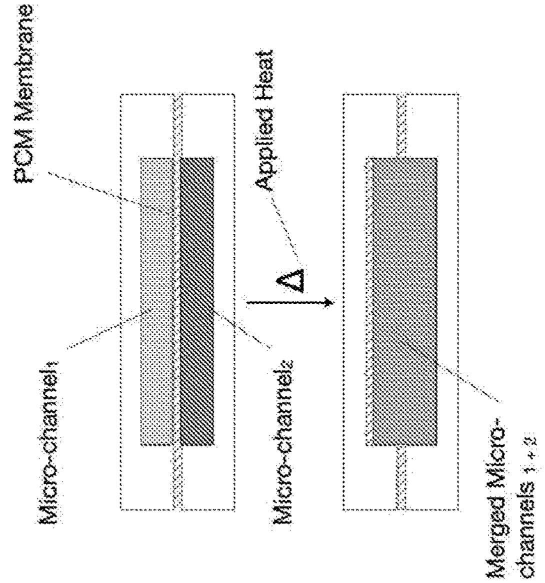
FIG. 7B shows a diagram of a first and second microchannel separated by a PCM microvalve.

Referring now to FIG. 7B, a first microfluidic flow section may comprise a first microchannel and a second microfluidic flow section may comprise a second microchannel. The microchannels may be separated by a solid PCM membrane. Heat greater than or equal to a melting temperature of the PCM membrane is applied. The liquid PCM may displace, removing a barrier between the two microchannels, creating an open valve and allowing fluid contents of each microchannel to merge.

Figure 7C:
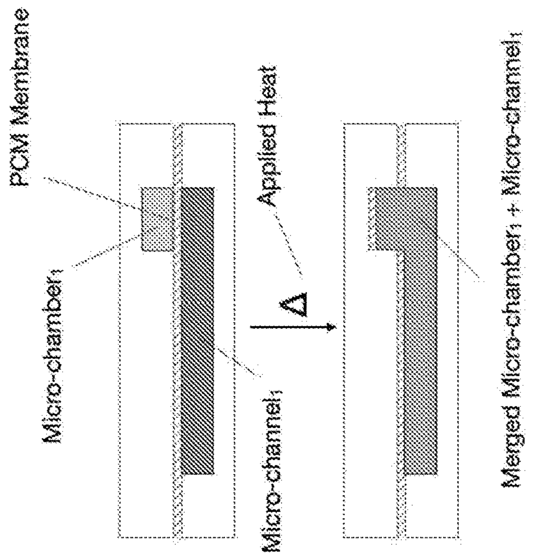
FIG. 7C shows a diagram of a microchamber and a microchannel separated by a PCM microvalve.
Figure 7D:
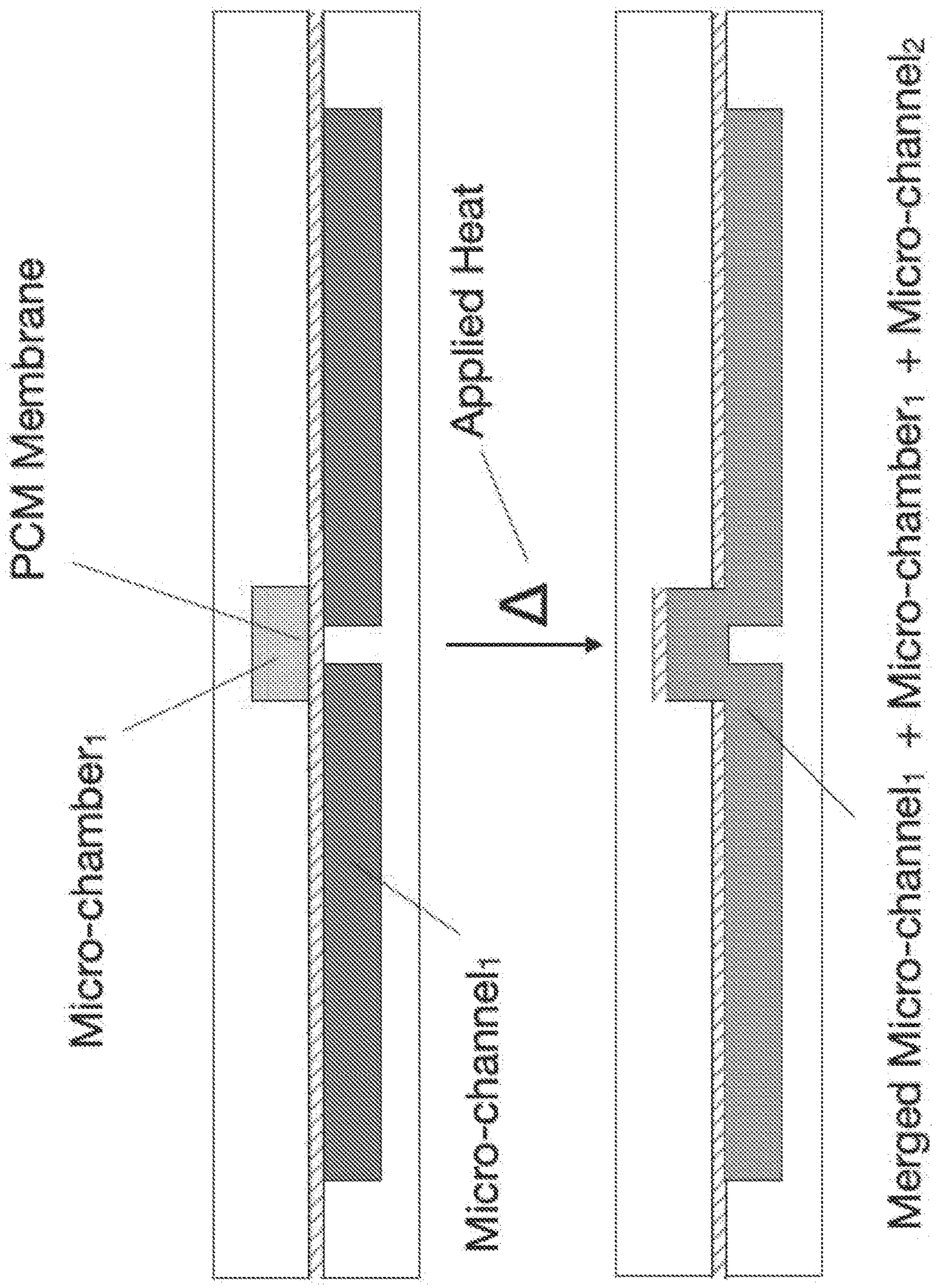
FIG. 7D shows a diagram of a microchamber and a first and second microchannel separated by a PCM microvalve.

Referring now to FIG. 7C, a first microfluidic flow section may comprise a microchamber and a second microfluidic flow section may comprise a microchannel. The microchamber and microchannel may be separated by a solid PCM membrane. Heat greater than or equal to a melting temperature is applied. The liquid PCM may displace, removing a barrier between the microchamber and the microchannel, creating an open valve and allowing fluid contents of the microchamber and microchannel to merge.

Referring now to FIG. 7D, a first microfluidic flow section may comprise a first microchannel, a second microfluidic flow section may comprise a microchamber, and a third microfluidic flow section may comprise a second microchannel. The flow sections may be separated by a solid PCM membrane. Heat greater than or equal to a melting temperature of the PCM membrane is applied. The liquid PCM may displace, removing a barrier between the flow sections, creating an open valve and allowing fluid contents of each flow section to merge.

Figure 8:
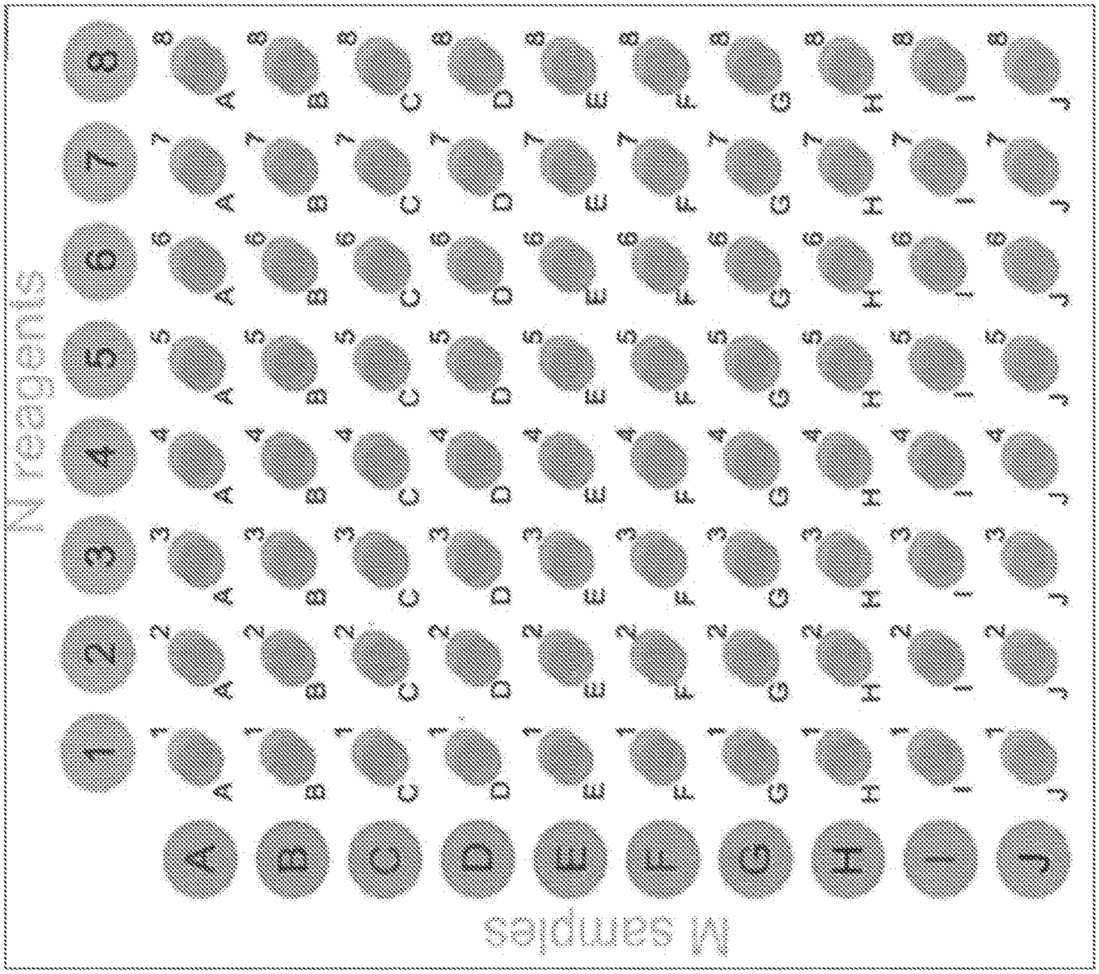
FIG. 8 shows a binary array of micro-droplets to be mixed. The present invention is ideal for use in such arrays of micro-droplets.
Figure 9:
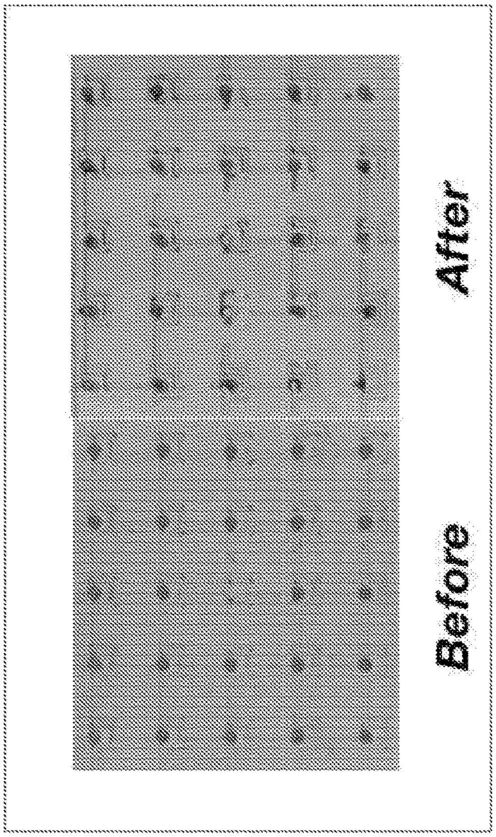
FIG. 9 shows a photograph of a binary array of micro-droplets before and after being mixed through the use of the present invention.
Figure 10:
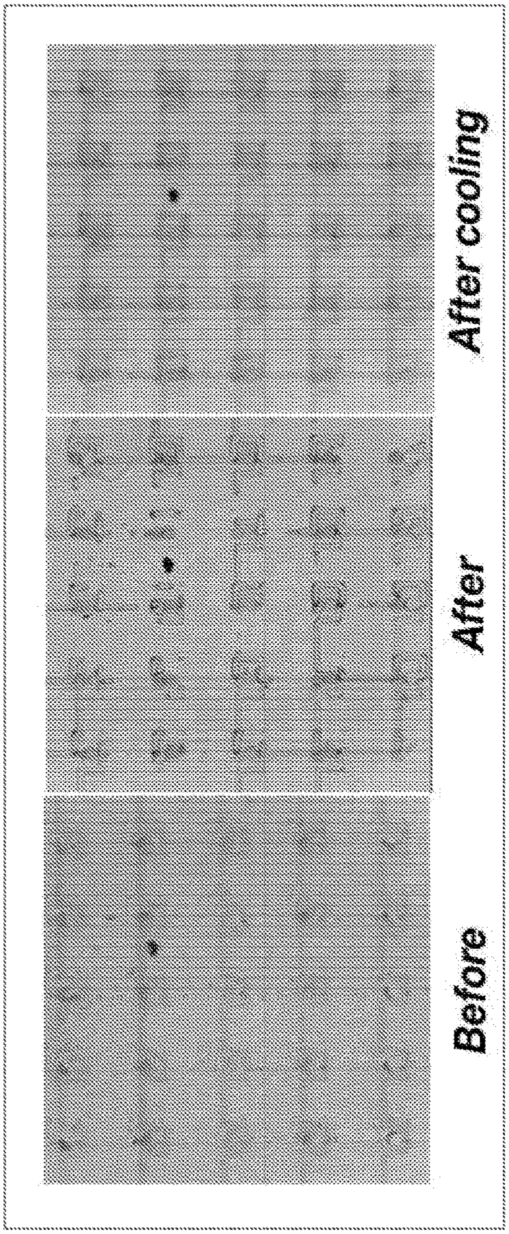
FIG. 10 shows a photograph of an array of micro-droplets before and after being mixed through the use of the present invention and after being cooled. The device used is identical to that shown in FIG. 9.
Figure 12:
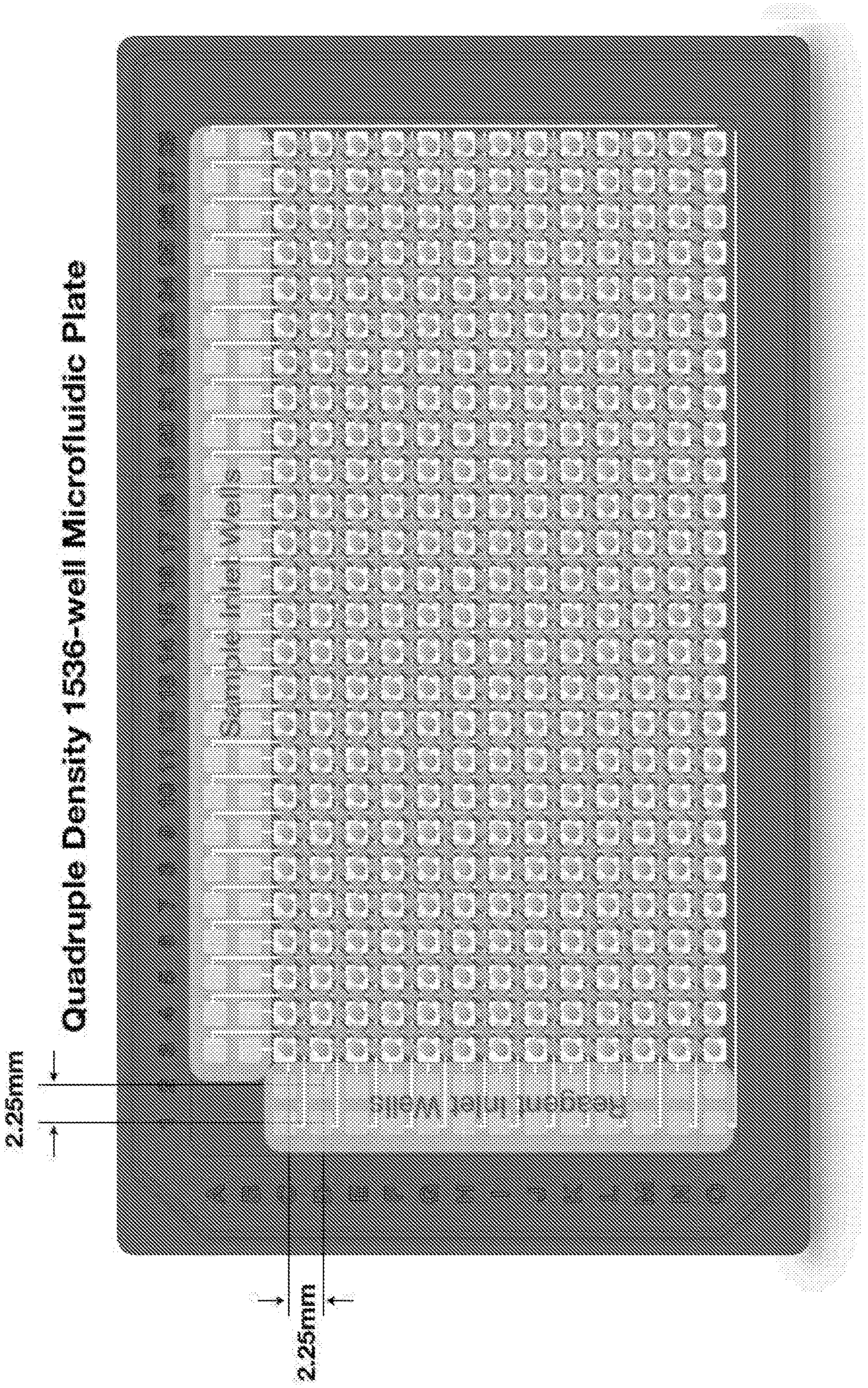
FIG. 12 shows a proposed new commercial device using the components of this invention which would increase the capabilities of current industry standard 1536 microtiter plates by nearly 4-fold.
Figure 13:
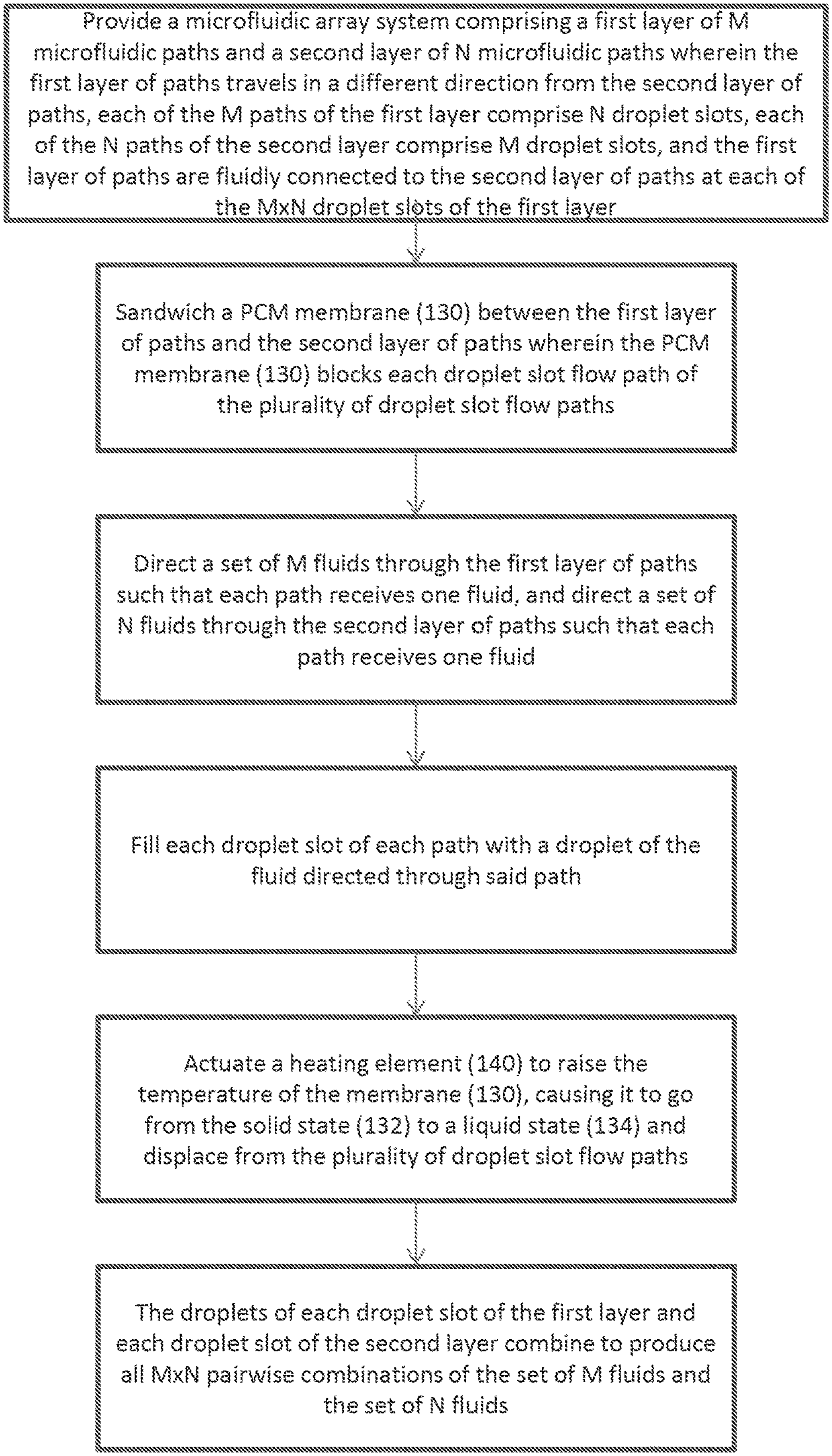
FIG. 13 shows a flow chart of producing all pairwise combinations of a set of M fluids and a set of N fluids.

Referring now to FIG. 8 and FIG. 13, the present invention features a method for producing all pairwise combinations of a first set of liquids and a second set of liquids in an efficient manner. MCN's may be defined on each layer for the purpose of generating and/or routing the transport of droplets or trapping them in specific organized locations in preparation for merging. Importantly, channels on different layers can overlap one another without interfering with each other. This becomes useful, for example, in the binary array pictured in FIG. 8. A set of 10 samples A-J and a set of 8 reagents 1-8 is shown. Each sample may be combined with each reagent individually, creating 80 individual reactions. This can be very neatly organized in the rectangular array as shown. Droplets from each sample may be distributed horizontally to the right, while droplets from each reagent may be distributed vertically downwards. Here, the horizontal and vertical paths will not interfere with each other if they are placed on separate layers. The droplets may then be trapped in the positions shown, with droplets aligned directly on top of one another in pairs. A paraffin microvalve is sandwiched between the two layers and the merging scheme described above can then be executed in parallel by applying the same heat to the entirety of the device. The result is a combinatorial matrix of all pairwise sample-reagent combinations possible in independent microreactors. Alternatively, it is possible that droplet pairs be addressed and merged independently with the application of a uniform focused energy source such as a laser, resistive heating elements or radiative heating from LEDs.

One method of distributing a linear array of droplets is to utilize the self-digitization approach such as previously published by the Vanapalli group ("Self-Digitization of Sample Volumes;" Dawn E. Cohen, Thomas Schneider, Michelle Wang, and Daniel T. Chiu; Analytical Chemistry 2010 82 (13), 5707-5717; DOI: 10.1021/ac100713u). Self-digitizing droplet arrays are MCN's consisting of a series of parallel channels in which each channel has a single fluid inlet and outlet. Channels contain a number of chambers connected serially through a main channel. Based on the geometry or assembly of the channel, as an aqueous solution is driven through the channel, each chamber is filled. Either air or oil is driven through the same channel following the aqueous solution, clearing the channel of the aqueous solution except for within the chambers. Thus, a static array of isolated droplets is patterned, with each droplet firmly trapped in place. The present invention shows that this self-digitization scheme works not only in a single layer device, as demonstrated by Vanapalli, but also works in a two-layer device in which a thin paraffin wax microvalve separates the layers. Self-digitization can be successfully performed on each layer independently.

Figure 14:
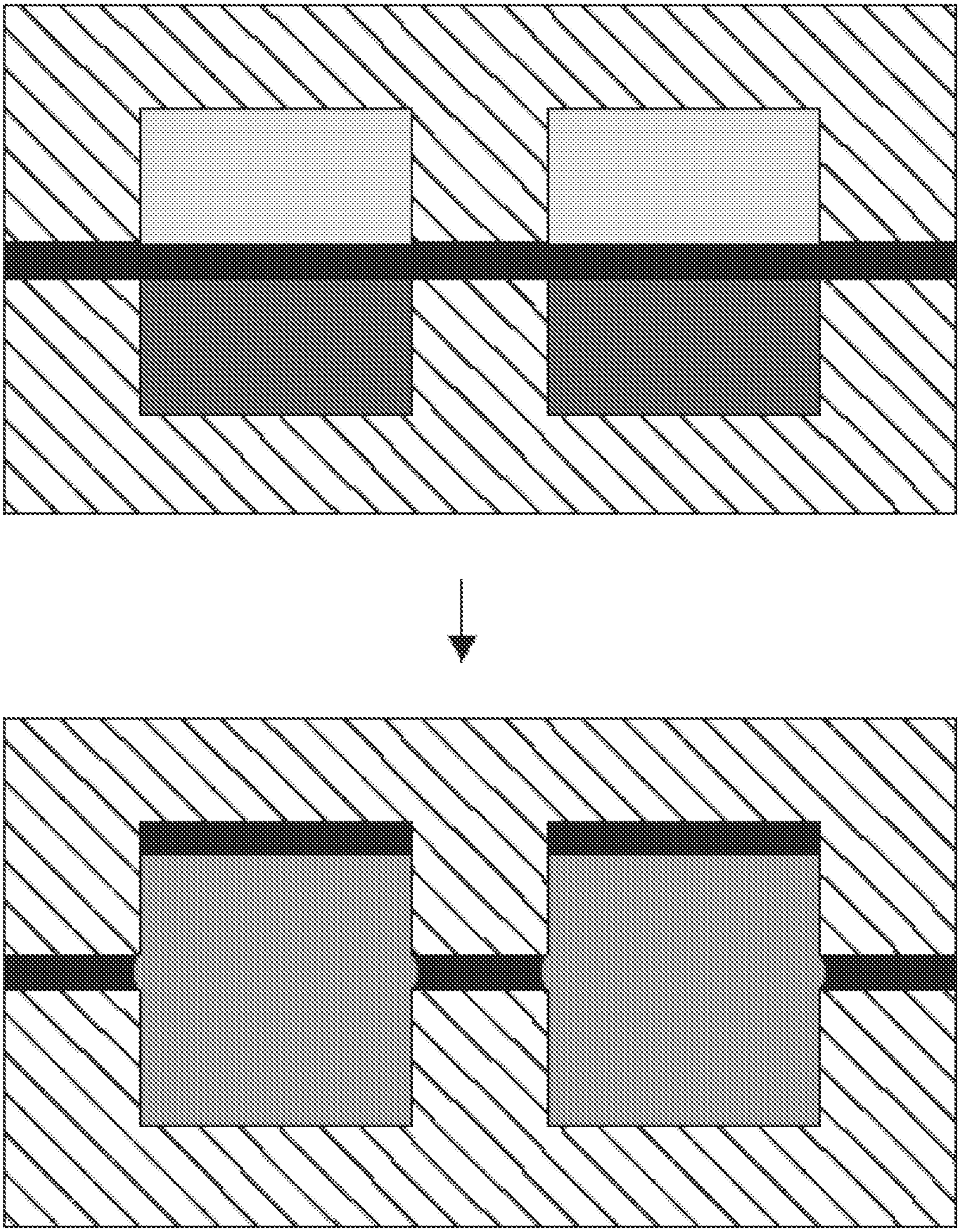
FIG. 14 shows a diagram of a PCM membrane sheet moving from a solid state to a liquid state, wherein the liquid state comprises a microvalve displacing from a flow path within a microfluidic system and the membrane remaining in place outside of the microfluidic system.

Referring now to FIG. 14, a preferred embodiment of the present invention features a PCM membrane sandwiched between a first upper microfluidic flow section and a first lower microfluidic flow section acting as a first microvalve, and sandwiched between a second upper microfluidic flow section and a second lower microfluidic flow section acting as a second microvalve. The PCM membrane may be thin relative to the dimensions of the microfluidic flow sections. The membrane may be thin relative to any combination of a width, a length, and a height of the chamber. The first upper and lower microfluidic flow sections each contain fluids separated by the first microvalve, and the second upper and lower microfluidic flow sections each contain fluids separated by the second microvalve. In this preferred embodiment, the PCM membrane is comprised of microvalve sections that are sandwiched between microfluidic flow sections, and non-microvalve sections that are not sandwiched between microfluidic flow sections. Applying heat to the PCM membrane causes the entire membrane to reach a liquid state. In the liquid state, the first and second microvalves float to a ceiling of both the first upper microfluidic flow section and the second upper microfluidic flow section respectively, causing the fluids of the first upper and lower microfluidic flow sections to mix together and causing the fluids of the second upper and lower microfluidic flow sections to mix and together respectively. In the liquid state, the PCM non-microvalve sections are pinned in place. In some embodiments, the non-microvalve sections are pinned in place by a surface tension effect that prevents leakage paths from being created.

Figure 15B:
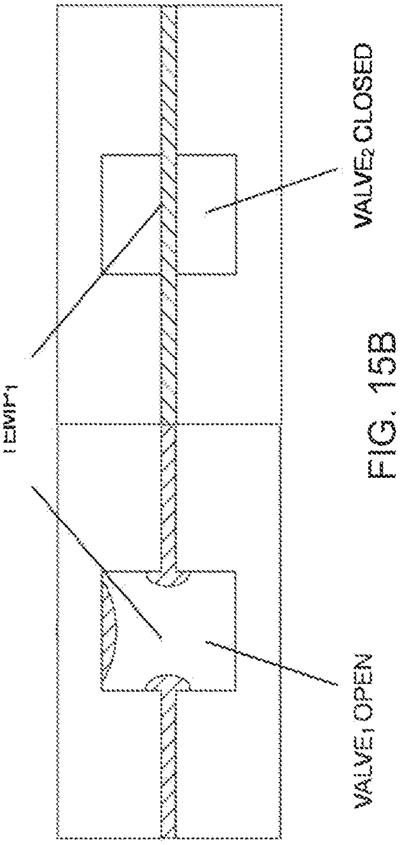
FIGS. 15A-15C show a method of actuating multiple microvalves independently of each other using a membrane comprised of different PCMs.
Figure 15A:
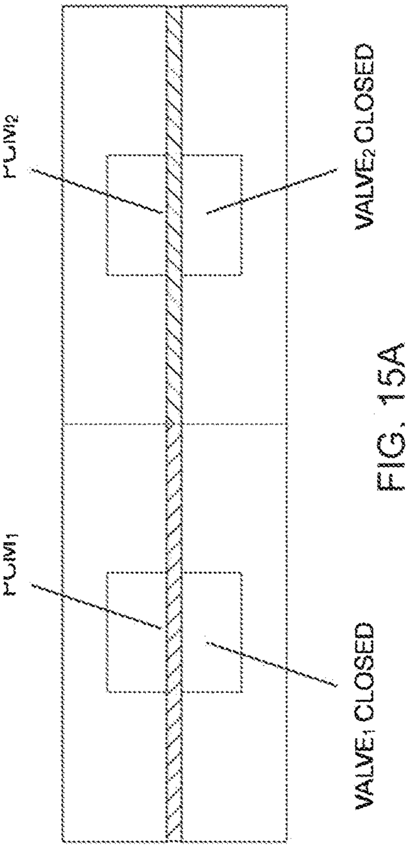
Figure 15C:
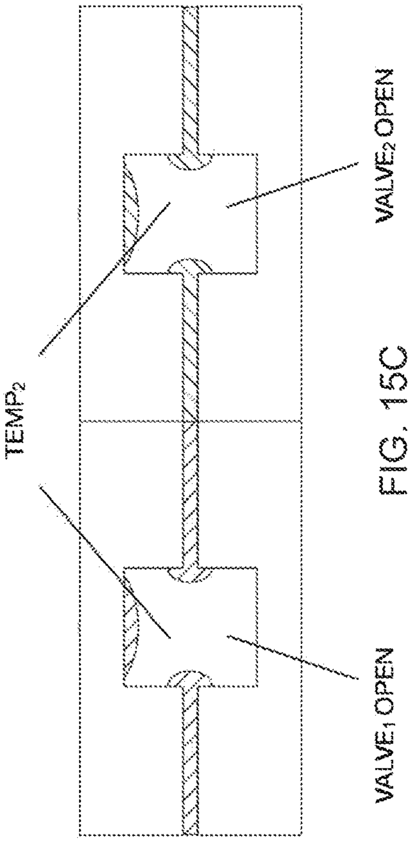

Referring now to FIGS. 15A-150, the present invention features a method for actuating a plurality of PCM microvalves independently of each other. As seen in FIG. 15A, the method may comprise providing a microfluidic system comprising a first microvalve ($VALVE_1$) with a first PCM ($PCM_1$) and a second microvalve ($VALVE_2$) with a second PCM ($PCM_2$). In some embodiments, the microfluidic system may comprise more than two microvalves with more than two melting temperatures. Each microvalve may act as a barrier between two or more distinct sets of microfluidic flow sections, creating two or more closed valves of different character. The structural material surrounding the flow sections are sealed against the solid PCM membrane, preventing leakage out of the flow sections. As seen in FIG. 15B, the method may further comprise applying heat to the microfluidic system at a temperature equal to or above the melting temperature of the first PCM microvalve but lower than the second PCM microvalve ($TEMP_1$). The first PCM microvalve reaches a liquid state and displaces, causing the first PCM microvalve to reach an open state. Meanwhile, the second PCM microvalve remains solid separating the flow sections and the second PCM microvalve remains closed. As seen in FIG. 15C, the method may further comprise applying heat to the microfluidic system at a temperature equal to or above the melting temperature of the second PCM microvalve ($TEMP_2$). The second PCM microvalve reaches a liquid state and displaces, causing the second PCM microvalve to reach an open state. This results in controlled actuation of two or more valves independently. In some embodiments, steps of the method may be repeated to actuate more than two PCM microvalves with more than two melting temperatures independently.

Figure 16A:
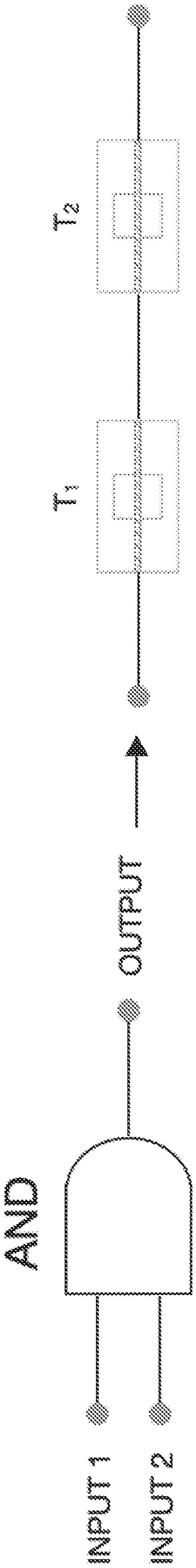
FIG. 16A shows a diagram of two PCM microvalve gates operating as an AND gate, where both of which may be actuated to allow a fluid to pass through the system.
Figure 16B:
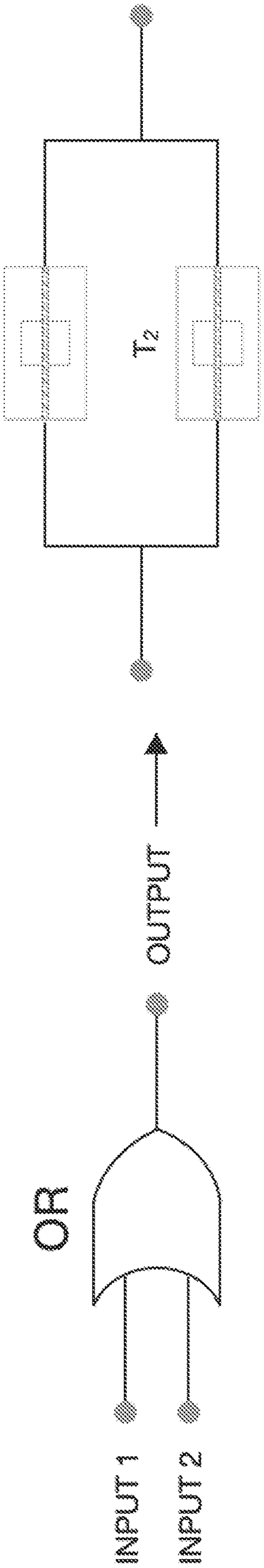
FIG. 16B shows a diagram of two PCM microvalve gates operating as an OR gate, only one of which may be actuated to allow a fluid to pass through the system.

Referring now to FIGS. 16A-16B, the method shown in FIGS. 15A-15C may be employed in a system featuring PCM microvalve boundaries for controlling flow of a fluid directed through a microfluidic system. As seen in FIG. 16A, the microfluidic system may comprise a first PCM microvalve with a first melting temperature and a second PCM microvalve with a second melting temperature, both of which act as boundaries on a single flow path. For a fluid to pass from a beginning to an end of the flow path, heat equal to or greater than the first and second melting temperatures may be applied to the microfluidic system to actuate both PCM microvalves into an open state. In some embodiments, more than two PCM microvalves with more than two melting temperatures act as boundaries along the flow path, and all PCM microvalves may be actuated to allow the fluid to pass through. This demonstrates utility of PCM microvalves in constructing AND gates for microfluidic applications. As seen in FIG. 16B, the microfluidic system may comprise a first PCM microvalve with a first melting temperature and second PCM microvalve with a second melting temperature. The microfluidic system may further comprise a flow path that branches into two branched paths, each branched path containing a microvalve acting as a boundary and merging back into a single flow path after each boundary. For a fluid to pass from a beginning to an end of the flow path, heat equal to or greater than either the first melting temperature, the second melting temperature, or both may be applied to the microfluidic system to actuate one or more microvalves into an open state. In some embodiments, the flow path branches into more than two branched paths, each branched path containing one or more PCM microvalve boundaries with separate melting temperatures. Each PCM microvalve along at least one branched path may be actuated to allow the fluid to pass through. This demonstrates utility of PCM microvalves in constructing OR gates for microfluidic applications.

Figure 17A:
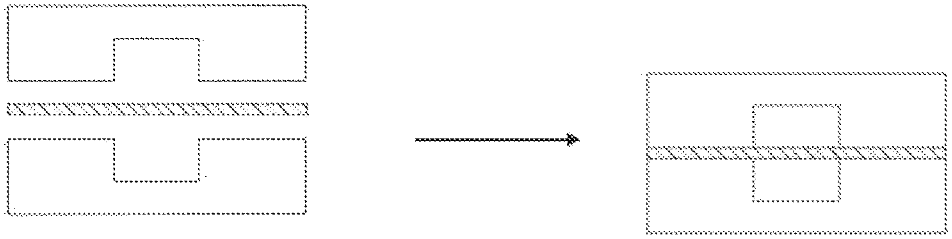
FIGS. 17A-17D show diagrams of various arrangements of microfluidic flow sections and PCM membranes.
Figure 17B:
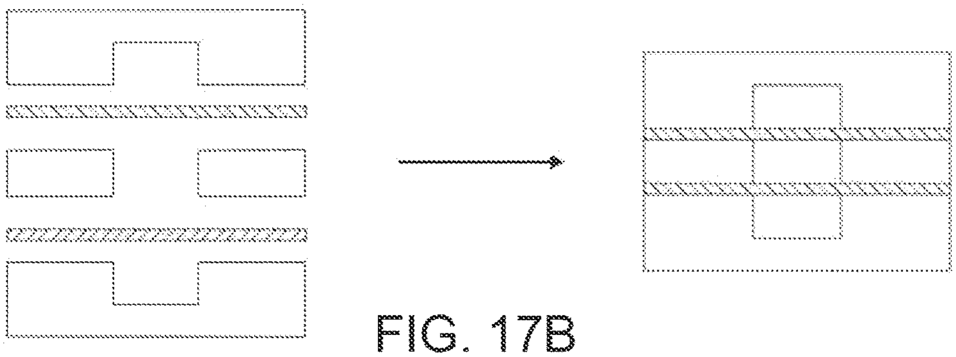
Figure 17C:
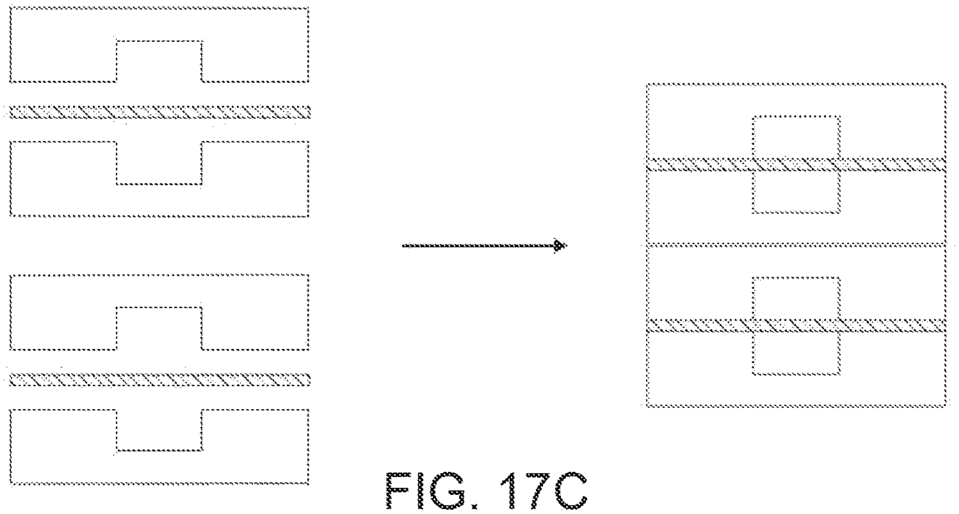
Figure 17D:
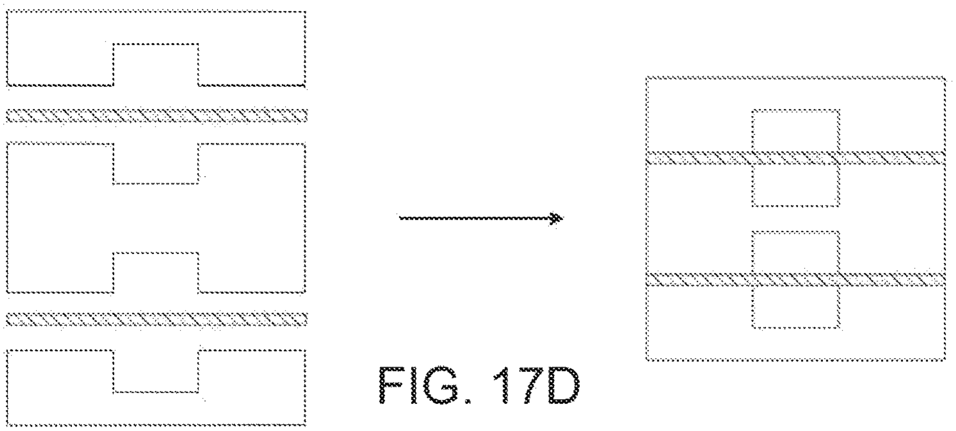

Referring now to FIG. 17A, a microfluidic system may comprise a first and second microfluidic flow section with a PCM membrane disposed between them. Referring now to FIG. 17B, a microfluidic system may comprise a first, second, and third microfluidic flow section. The system may further comprise a first PCM membrane disposed between the first and second microfluidic flow sections, and a second PCM membrane disposed between the second and third microfluidic flow sections. Referring now to FIG. 17C, a microfluidic system may comprise a first, second, third, and fourth microfluidic flow section. The system may further comprise a first PCM membrane disposed between the first and second microfluidic flow sections, and a second PCM membrane disposed between the third and fourth microfluidic flow sections. Referring now to FIG. 17D, a microfluidic flow section may comprise a first, second, and third microfluidic flow section such that the second microfluidic flow section comprises a first and second microchamber. The system may further comprise a first PCM membrane disposed between the first microfluidic flow section and the first microchamber, and a second PCM membrane disposed between the third microfluidic flow section and the second microchamber. Additionally, various configurations of microfluidic flow sections and PCM membranes are possible.

Figure 18A:
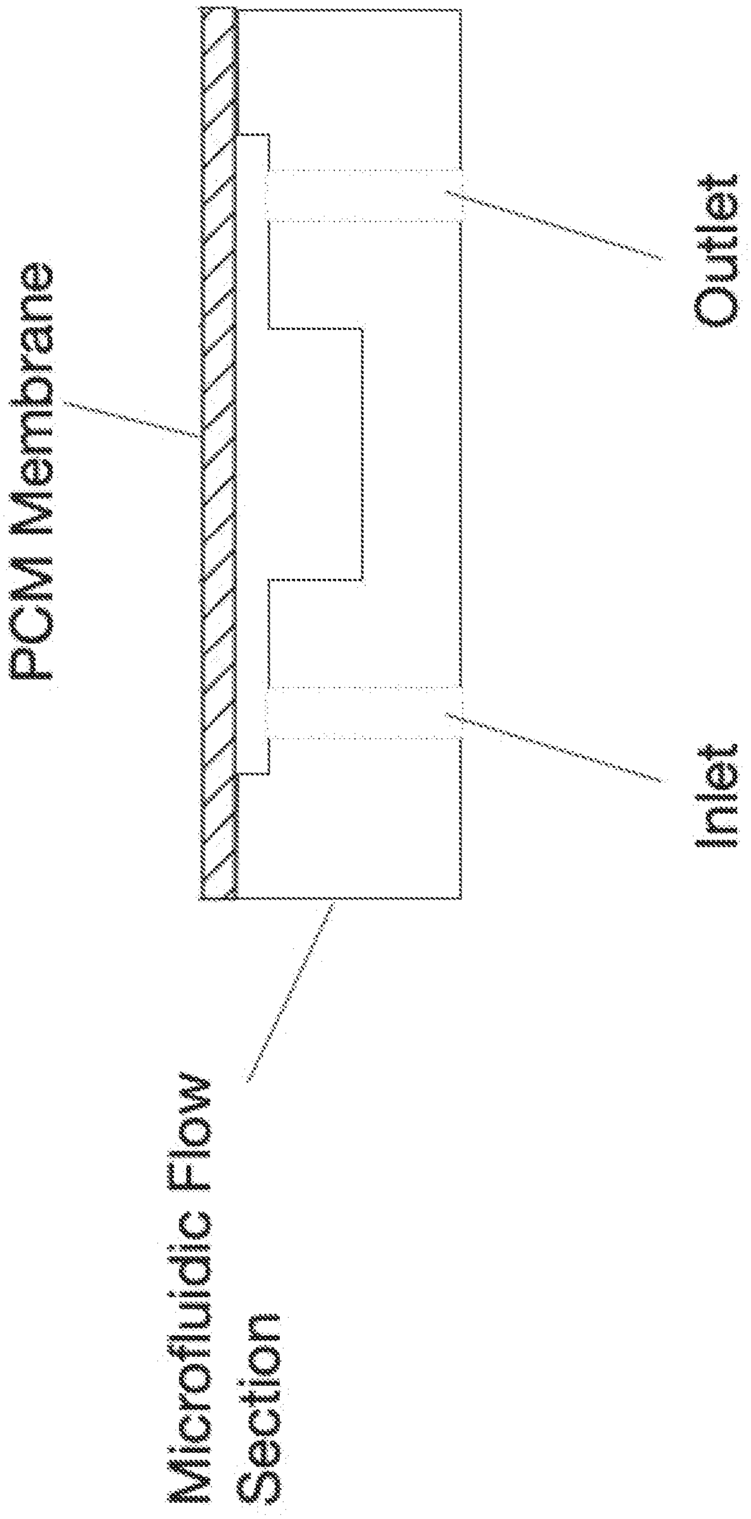
FIG. 18A shows a diagram of a microfluidic flow section sealed by a PCM membrane.
Figure 18B:
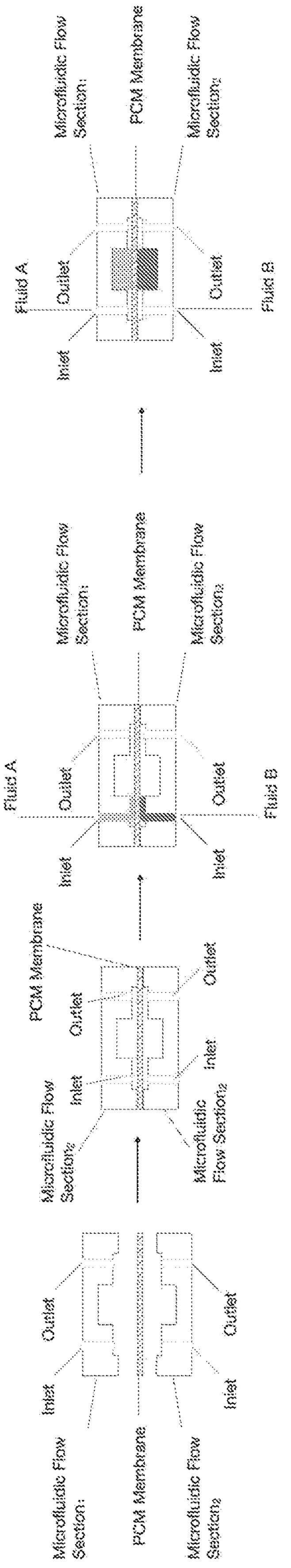
FIG. 18B shows a diagram of a first and a second microfluidic flow section sealed and kept separate by a PCM membrane.
Figure 18C:
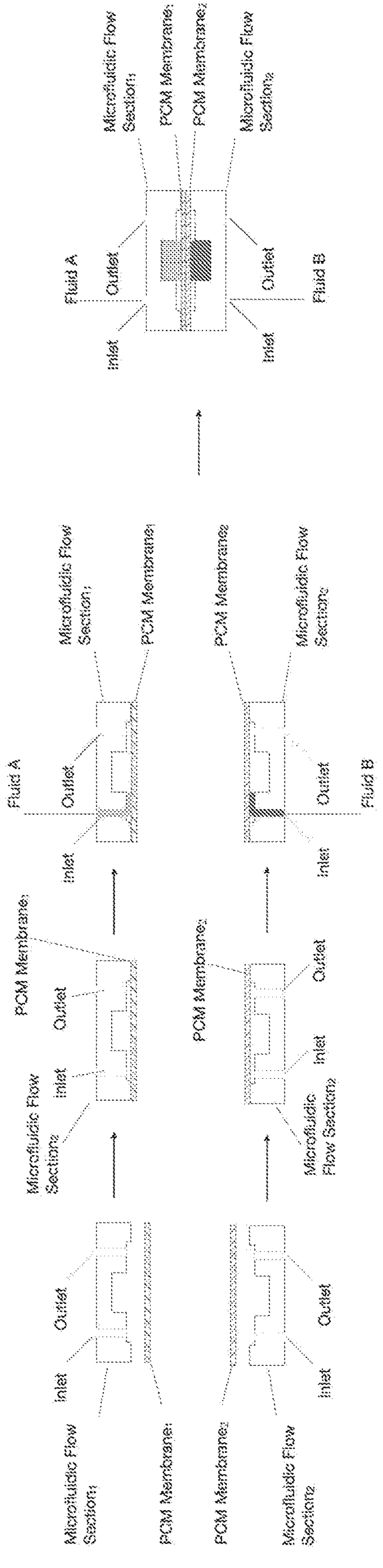
FIG. 18C shows a diagram of a first and a second microfluidic flow section, each sealed by a PCM membrane.

Referring now to FIG. 18A, a microfluidic flow section may comprise an inlet and an outlet for fluid introduction and removal. A PCM membrane may be situated such that it seals the microfluidic flow section, keeping fluid fully contained within the microfluidic flow section. Referring now to FIG. 18B, a microfluidic system may comprise a first and a second microfluidic flow section. A single PCM membrane may seal both the first and second microfluidic flow section such that the PCM membrane acts as a floor of the first microfluidic flow section and a ceiling of the second microfluidic flow section. This allows separate introduction of a fluid A into the first microfluidic flow section through a first inlet independently of introducing a fluid B into the second microfluidic flow section through a second inlet. The PCM membrane may seal the first and second microfluidic flow section independently of each other and prevent cross-contamination during introduction of fluids into the microfluidic system. Additionally, the fluid A may be removed from the first microfluidic flow section through a first outlet and the fluid B may be removed from the second microfluidic flow section through a second outlet. Referring now to FIG. 18C, a microfluidic system may comprise a first and a second microfluidic flow section, each flow section comprising a PCM membrane seal. A first PCM membrane acts as a floor of the first microfluidic flow section and a second PCM membrane acts as a ceiling of the second microfluidic flow section. In the depicted embodiment, each microfluidic flow section is a sealed and independent entity. This allows handling and introduction of fluids to each microfluidic flow section independently as completely separate structures. This allows separate introduction of a fluid A into the first microfluidic flow section through a first inlet independently of introducing a fluid B into the second microfluidic flow section through a second inlet. Additionally, the fluid A may be removed from the first microfluidic flow section through a first outlet and the fluid B may be removed from the second microfluidic flow section through a second outlet. The two separate structures can potentially be reunited and the first and second PCM membranes can be actuated as a single entity.

Figure 19A:
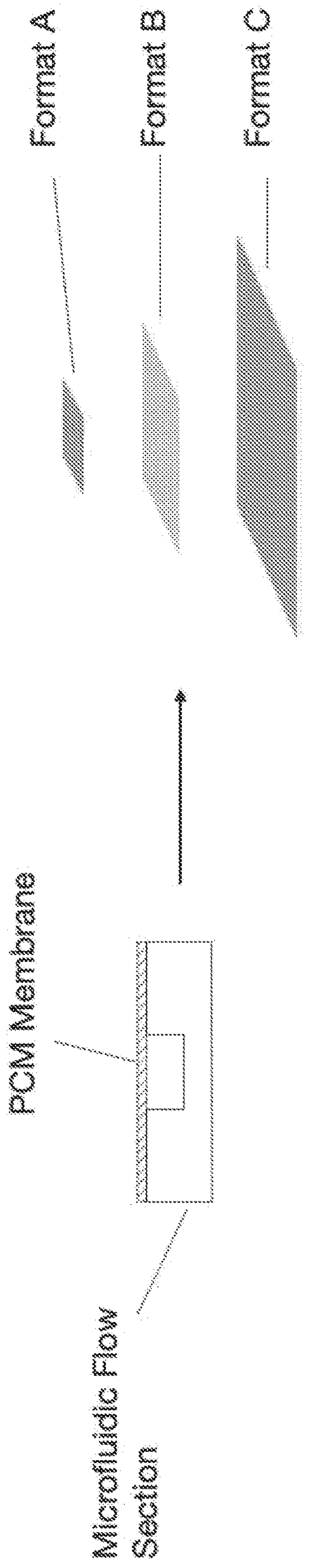
FIGS. 19A-19B show diagrams of various microfluidic flow sections and PCM membrane formats, depicting modularity of said components.
Figure 19B:
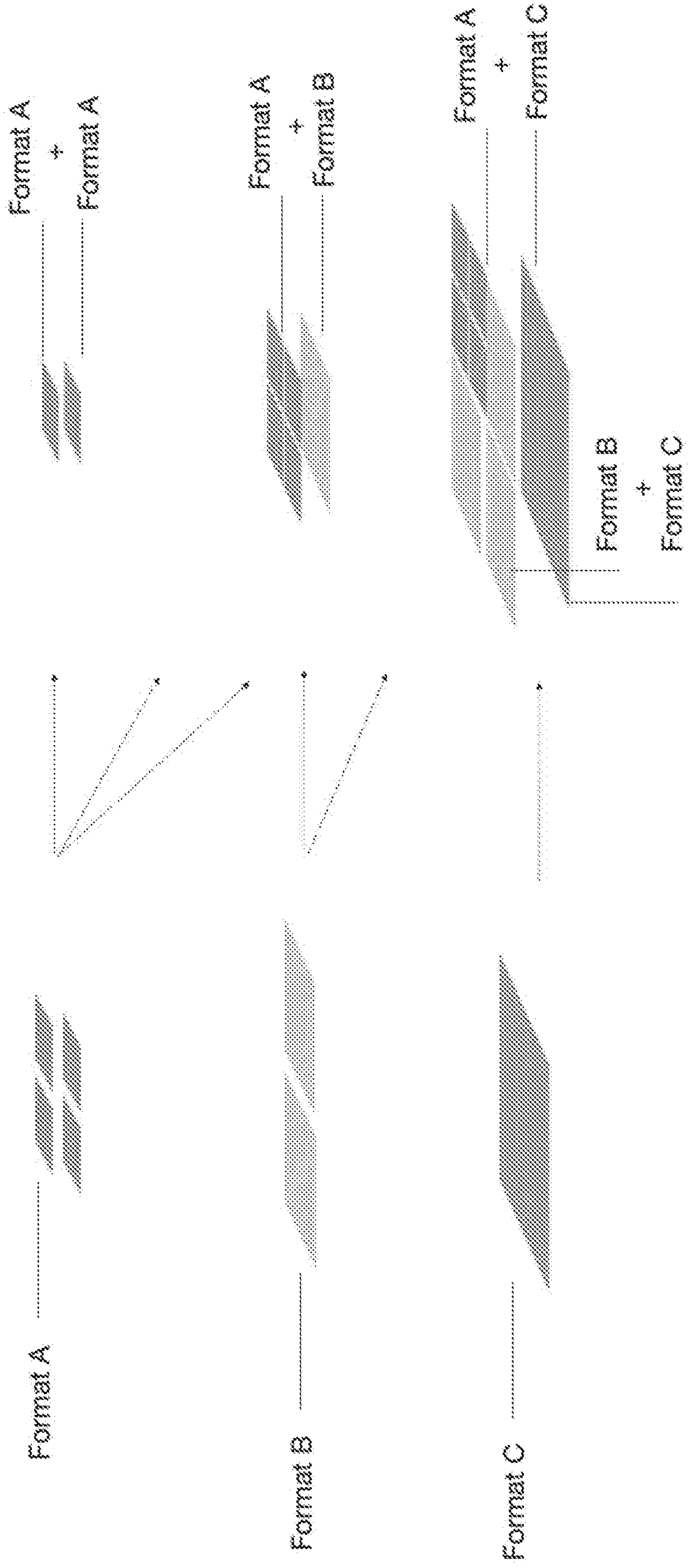

Referring now to FIGS. 19A-19B, the present invention features modularity of microfluidic flow sections and PCM membranes. As seen in FIG. 19A, a module may be comprised of a microfluidic flow section and a PCM membrane. The PCM membrane may be situated such that it seals the microfluidic flow section such that a fluid may be fully contained within the module. A footprint of the module can be of different dimensions as seen in Format A, Format B, and Format C. Format A may be an integer fraction of Format B. Format B may be an integer fraction of Format C. As seen in FIG. 19B, a module may be comprised of a microfluidic flow section and a PCM membrane. A fully assembled device may comprise sandwiching a first and a second module by bringing the PCM membrane of the first module into contact with the PCM membrane of the second module. A plurality of modules may be chosen to operate in different run modes by sandwiching modules of differing formats. A first run mode may be comprised of a first and a second module of an identical format (Format A+Format A, Format B+Format B, Format C+Format C). A second run mode may be comprised of a plurality of modules of a first format such that a plurality of footprints of the modules of the first format match a size of a footprint of a module of a second format. A third run mode may be comprised of selecting variations of smaller modules paired with a module of a larger format. Any number of module formats and run modes may be employed by the present invention, illustrating modularity in systems utilizing PCM microvalves.

EXAMPLE

The following is a non-limiting example of the fabrication method of the present invention. It is to be understood that said example is not intended to limit the present invention in any way. Equivalents or substitutes are within the scope of the present invention.

A microtome was employed to slice a paraffin block into sheets as thin as 50 μm, and the entire sheet was sandwiched between two layers of microfluidic channels. Immediately after microtome slicing, the paraffin sheets were warm and soft, and the sheets sealed well against substrates patterned with microchannels. With the wax in place, the two microchannel layers were completely isolated from each other, and the self-digitization features worked well on both layers with no crosstalk. Upon heating to 95° C., merging between paired compartments was observed. This heating step is similar to the beginning of hot start PCR, and so a dedicated merging step may not be required. The standard self-digitization protocol requires two loading steps: flowing of an aqueous solution to load the traps, followed by flowing of oil to clear the channels. However, we found that if air is substituted for oil, both self-digitization and merging of compartments can still be performed successfully. It was predicted that melting the paraffin sheet would create leak paths that could allow cross contamination between neighboring chambers, but, unexpectedly, the melted wax appeared to stay pinned in place by surface tension, maintaining the seal between the two channel layers.

In order to achieve the lowest cost per device, this device is produced in a thermoplastic material for compatibility with injection molding. The ideal material is an optically transparent, chemically compatible, hydrophobic polymer with low moisture permeability. Cyclic Olefin Copolymer (COC) and Cyclic Olefin Polymer (COP) are commonly employed for making microtiter plates and fit the criteria well.

Channels are patterned in COC sheets by CNC micromilling, employing the Mini Mill CNC platform by Haas Automation. Accurate control of surface planarity is critical in order to machine exact channel depths, and thus a diamond-tipped fly cutter (3316A32, McMaster-Carr, Santa Fe Springs, CA) is employed to planarize the surface of the die prior to machining. Individual milling tools are aligned to the die surface in a two-step process prior to each fabrication run. Polydimethylsiloxane (PDMS) sheets with a thickness of 254 μm (HT-6240, Rogers Corp, Rogers CT) are sputter-coated with 30 nm of gold. This conductive sheet is placed on the surface of the die. As each tool is lowered, a multimeter is used to measure the conductivity between the tool and the sheet in order to detect the moment of contact. This can achieve a vertical alignment accuracy of about 25 μm without damaging the small fragile tools, as might occur with shim methods. Once this initial alignment is complete, fine alignment is performed by positioning each tool at a nominal position of 100 μm above the substrate surface and then translating the active tool downwards at a shallow angle (1.414 mm lateral and 200 μm vertical). Measuring the length of the resulting cut allows the vertical offset of the tool to be determined and corrected. Further, by measuring the vertical offset at multiple points across the die, this technique is also employed to measure the horizontal alignment of the die surface after fly cutting.

While CNC machining is an excellent way to prototype COC or COP devices, the final commercial product is optimally produced by injection molding. Vendors including Technicolor Precision BioDevices (Camarillo, CA) and Z-Microsystems (San Diego, CA) are producing cost-efficient injection molding methods and devices. The latter offers rapid prototyped injection molding at a low cost for a small device.

The present invention features a method for controlling a path of a fluid using a phase-change microvalve in a microfluidic platform. In some embodiments, the method may comprise providing a microfluidic system. The microfluidic system may comprise a first microfluidic flow section, a second microfluidic flow section, and the phase-change microvalve comprising at least one phase-change material (PCM) membrane sandwiched between the first microfluidic flow section and the second microfluidic flow section acting as a microvalve. A thickness of the microvalve may be thin relative to dimensions of the first microfluidic flow section and dimensions of the second microfluidic flow section, and the microvalve may be in a solid state. The method may further comprise directing a fluid through the first microfluidic flow section such that the fluid is blocked from reaching the second microfluidic flow section by the microvalve. The method may further comprise heating the PCM membrane to its melting point, and thus changing the PCM membrane from the solid state to a liquid state. Reaching the liquid state may comprise a sufficient degree of displacement from between the first microfluidic flow section and the second microfluidic flow section within the microfluidic system thereby allowing the fluid to travel from the first microfluidic flow section to the second microfluidic flow section. The method may further comprise directing the fluid from the first microfluidic flow section to the second microfluidic flow section.

In some embodiments, the microfluidic system may further comprise a plurality of microfluidic flow sections and a plurality of microvalves. Each microvalve of the plurality of microvalves may be sandwiched between at least two microfluidic flow sections of the plurality of microfluidic flow sections. Changing the membrane to the liquid state may comprise a sufficient degree of displacement from between the at least two microfluidic flow sections within the microfluidic system thereby allowing the fluid to travel between the at least two microfluidic flow sections. This embodiment may be useful for high-throughput genotyping practices. In some embodiments, each microfluidic flow section of the plurality of microfluidic flow sections may comprise a microchannel or a microchamber. In some embodiments, the PCM may comprise paraffin wax. and at least one membrane of the plurality of microvalves may have a thickness of 10 nm to 1 cm. The fluid may apply a buoyancy differential to the microvalve in the liquid state, wherein the buoyancy differential causes the microvalve in the liquid state to move upwards or downwards.

The present invention, as a non-limiting example, may be used for high-throughput genotyping at the micro-scale. Melting the wax layer simultaneously allows mixing of a large array of paired reagents. Paraffin gating is combined with microfluidic self-digitization to create a simple-to-use device for generating pairwise combinations of plant DNA samples and marker-specific Kompetitive Allele Specific PCR (KASP) reagents. Liquids are dispensed into the device in microliter volumes compatible with conventional liquid handling, but reactions are performed in nanoliter volumes in order to achieve a sharp cost reduction. Furthermore, only 152 pipetting steps will be required to set up 5520 genotyping reactions in a single microtiter-format device, rather than the 11,040 pipetting steps required conventionally.

The present invention, as a non-limiting example, may be used for high-throughput application of liquid droplets to a large plurality of organic samples. Melting the wax layer simultaneously allows for a large quantity of liquid droplets to be applied to a large quantity of small organic samples for the purpose of nutrition, oxygenation, or reaction-analysis all at once. Once again, liquids are dispensed into the device in microliter volumes compatible with conventional liquid handling, but reactions are performed in nanoliter volumes in order to achieve a sharp cost reduction.

The present invention, as a non-limiting example, may be used in standard microfluidic platforms as a liquid control valve that is efficiently sized and manufactured. Prior systems, as cited above, require the milling of a plurality of additional channels for wax movement and additional components, while the present invention only requires a small amount of extra space for the melted wax to be directed to in order to allow liquid to flow past the valve and an external heating component. The present invention allows for efficient fabrication, application, and use of a phase-change microvalve in a wide range of microfluidic platforms.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method of fabricating a microvalve comprising a PCM for microfluidic systems, the method comprising:

a. providing a block comprising the PCM;

b. sectioning a membrane comprising the PCM from the block through the use of a tissue sectioning instrument; and c. sandwiching the membrane between a first microfluidic flow section and a second microfluidic flow section, wherein the membrane acts as a zero-leakage microvalve between the first microfluidic flow section and the second microfluidic flow section;

wherein a thickness of the microvalve in a solid state is at most ⅕ of a width of the first microfluidic flow section and a width of the second microfluidic flow section such that the phase-change microvalve in a liquid state displaces from a flow path of the first microfluidic flow section and the second microfluidic flow section without leaking;

wherein the membrane is in the solid state at room temperature; and wherein heat causes the membrane to enter the liquid state.

2. The method of claim 1, wherein the PCM comprises paraffin wax.

3. The method of claim 1, wherein the membrane has a thickness of 10 nm to 1 cm.

4. The method of claim 1, wherein the tissue sectioning instrument is a microtome.

5. The method of claim 1, wherein more than one membrane is sectioned from the block to be sandwiched between the first microfluidic flow section and the second microfluidic flow section.

6. The method of claim 1, wherein a membrane is sandwiched between more than two microfluidic flow sections in a microfluidic system.

7. A method for controlling a path of a fluid using a phase-change microvalve in a microfluidic platform, the method comprising:

a. providing a microfluidic system comprising a first microfluidic flow section, a second microfluidic flow section, and the phase-change microvalve comprising at least one phase-change material (PCM) membrane sandwiched between the first microfluidic flow section and the second microfluidic flow section acting as a microvalve;

wherein a thickness of the microvalve in a solid state is at most ⅕ of a width of the first microfluidic flow section and a width of the second microfluidic flow section such that the phase-change microvalve in a liquid state displaces from a flow path of the first microfluidic flow section and the second microfluidic flow section without leaking;

wherein the microvalve is in the solid state;

b. directing a fluid through the first microfluidic flow section such that the fluid is blocked from reaching the second microfluidic flow section by the microvalve;

c. heating the PCM membrane to its melting point;

d. changing, by the PCM membrane, to the liquid state;

wherein reaching the liquid state comprises a sufficient degree of displacement from between the first microfluidic flow section and the second microfluidic flow section within the microfluidic system thereby allowing the fluid to travel from the first microfluidic flow section to the second microfluidic flow section; and e. directing the fluid from the first microfluidic flow section to the second microfluidic flow section.

8. The method of claim 7, wherein the microfluidic system further comprises a plurality of microfluidic flow sections and a plurality of microvalves, wherein each microvalve of the plurality of microvalves is sandwiched between at least two microfluidic flow sections of the plurality of microfluidic flow sections, wherein the membrane reaching the liquid state comprises a sufficient degree of displacement from between the at least two microfluidic flow sections within the microfluidic system thereby allowing the fluid to travel between the at least two microfluidic flow sections.

9. The method of claim 7, wherein each microfluidic flow section of the plurality of microfluidic flow sections comprises a microchannel or a microchamber.

10. The method of claim 7, the PCM comprises paraffin wax.

11. The method of claim 7, wherein at least one membrane of the plurality of microvalves has a thickness of 10 nm to 1 cm.

12. The method of claim 7, wherein the fluid applies a buoyancy differential to the microvalve in the liquid state, wherein the buoyancy differential causes the microvalve in the liquid state to move upwards or downwards.

13. A microfluidic system for controlling a path of a fluid using a phase-change microvalve, the system comprising:

a. a first microfluidic flow section; and b. a second microfluidic flow section; and c. the phase-change microvalve comprising at least one phase-change material (PCM) membrane sandwiched between the first microfluidic flow section and the second microfluidic flow section acting as a microvalve;

wherein a thickness of the microvalve in a solid state is at most ⅕ of a width of the first microfluidic flow section and a width of the second microfluidic flow section such that the phase-change microvalve in a liquid state displaces from a flow path of the first microfluidic flow section and the second microfluidic flow section without leaking;

wherein the PCM membrane is in the solid state at room temperature;

wherein the fluid directed through the first microfluidic flow section is blocked from reaching the second microfluidic flow section by the microvalve when the membrane is in the solid state; and wherein heating the PCM membrane to its melting point causes the membrane to enter the liquid state;

wherein reaching the liquid state comprises a sufficient degree of displacement from between the first microfluidic flow section and the second microfluidic flow section within the microfluidic system thereby allowing the fluid to travel from the first microfluidic flow section to the second microfluidic flow section.

14. The system of claim 13, wherein the microvalve separates the fluid in the first microfluidic flow section from a fluid in the second microfluidic flow section.

15. The system of claim 13, wherein the first microfluidic flow section is a microchamber or microchannel.

16. The system of claim 13, wherein the second microfluidic flow section is a microchamber or microchannel.

17. The system of claim 13, wherein the PCM comprises paraffin wax.

18. The system of claim 13, wherein the membrane has a thickness of 10 nm to 1 cm.

19. The system of claim 13, wherein the microvalve in the liquid state is configured to move upwards or downwards in response to a buoyancy differential applied by the fluid.

* * * * *